United States Patent [19]
Noguchi et al.

[11] Patent Number: 5,883,476
[45] Date of Patent: Mar. 16, 1999

[54] CONVERGENCE CORRECTION SYSTEM WITH RECOVERY FUNCTION AND DISPLAY APPARATUS USING THE SAME

[75] Inventors: Yasuji Noguchi; Yuichiro Kimura, both of Yokohama; Kuninori Matsumi; Kenicji Matsumoto, both of Fujisawa; Mitsuo Okimoto, Chigasaki; Michitaka Ohsawa, Fujisawa; Akito Takemoto, Chigasaki; Sadao Kubota, Yokohama; Kazuhiro Kaizaki, Odawara; Chiharu Ishino, Fujisawa, all of Japan

[73] Assignee: Hitachi, Ltd., Tokyo, Japan

[21] Appl. No.: 475,108

[22] Filed: Jun. 7, 1995

[30] Foreign Application Priority Data

Jun. 9, 1994 [JP] Japan .................... 6-127270
Jun. 13, 1994 [JP] Japan .................... 6-130061
Jun. 13, 1994 [JP] Japan .................... 6-130066
Jun. 15, 1994 [JP] Japan .................... 6-133057

[51] Int. Cl.⁶ .................................................. H01J 29/51
[52] U.S. Cl. .................... 315/368.12; 348/177; 348/181; 348/745; 348/807; 348/813
[58] Field of Search ................. 315/368.12; 348/813, 348/807, 746, 745, 177, 181

[56] References Cited

U.S. PATENT DOCUMENTS

| | | |
|---|---|---|
| 4,857,998 | 8/1989 | Tsujihara et al. . |
| 4,868,668 | 9/1989 | Tavernetti . |
| 5,200,815 | 4/1993 | Tsujihara et al. . |
| 5,532,765 | 7/1996 | Inoue et al. ............................... 348/807 |
| 5,602,932 | 2/1997 | Macdonald et al. . |

*Primary Examiner*—Theodore M. Blum
*Attorney, Agent, or Firm*—Antonelli, Terry, Stout & Kraus, LLP

[57] ABSTRACT

A plurality of photo detectors are arranged outside the display screen of a projection display apparatus having a built-in digital convergence correction system and a function for adjusting data in the frame memory so as to coincide the photoelectric devices of the photo detectors with the adjustment patterns is provided. The adjusted data when the convergence on the entire screen of the display is adjusted and the adjusted data when the convergence is adjusted by the adjustment function before misconvergence is generated are memorized beforehand. When misconvergence is generated, the convergence is adjusted by the adjustment function again, and a corresponding correction value is obtained on the photo detector by calculating the adjusted data at this time and the prememorized adjusted data, and a correction value on the entire screen is obtained by executing an interpolation calculation from this correction value, and the misconvergence on the entire screen is corrected.

9 Claims, 38 Drawing Sheets

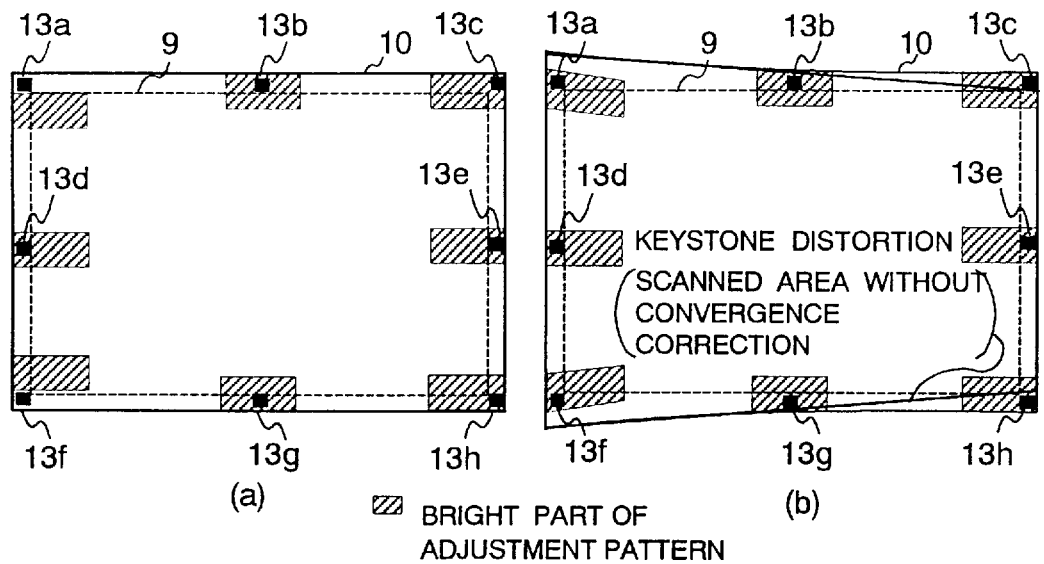
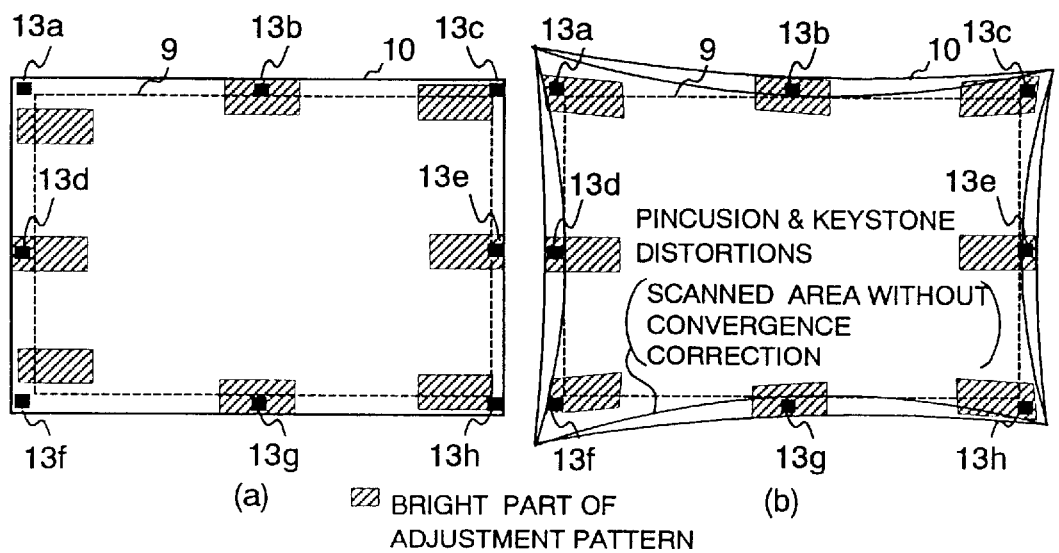

(a)   (b)

CONVERGENCE CORRECTION SYSTEM WITH RECOVERY FUNCTION AND DISPLAY APPARATUS USING THE SAME

BACKGROUND OF THE INVENTION

The present invention relates to a convergence correction system for a CRT display apparatus such as a color TV set, a display, and a projection TV set for correcting misconvergence using a digital memory and more particularly to a convergence correction system with recovery function for correcting misconvergence using a photo detector and a display apparatus using it.

In a color projection display apparatus using a plurality of projection tubes, misconvergence is generated on the display screen because the incident angle to the screen varies with each projection tube. To correct this misconvergence precisely on the screen, a convergence correction system is used. For example, Japanese Patent Application Laid-Open Sho 57-212492 discloses a digital convergence correction system which can adjust convergence with high precision. However, it is not taken into account in the above correction system that there is a possibility that the convergence changes due to geomagnetism and temperature after convergence adjustment. If this occurs, it is necessary to adjust the convergence each time. Therefore, for example, an apparatus for automatically correcting this misconvergence is proposed in Japanese Patent Application Laid-Open Sho 63-209388.

As a method for detecting misconvergence, in the aforementioned conventional example, a method that a light-position sensor using a detection device having a position calculation function, for example, a semiconductor light-position sensor is arranged in the overscanned area is used. However, a light-position sensor is generally expensive. On the other hand, for example, as an art indicated in Japanese Patent Application Laid-Open Sho 63-224572, a method that a plurality of inexpensive photoelectric devices which are neighboring to each other detect in the same way as a light-position sensor is known. However, to correct misconvergence with high precision, it is necessary to detect it at a plurality of positions and arrange many photoelectric devices. As a result, a problem arises that the number of connected lines increases and the control becomes complicated.

SUMMARY OF THE INVENTION

An object of the present invention is to provide a convergence correction system with recovery function and display apparatus using it which can correct misconvergence on the entire screen using a simple constitution.

In a projection display apparatus having a built-in digital convergence correction system for reading correction data in the frame memory according to scanning, to accomplish the above object, photo detectors including photoelectric device which are arranged at a plurality of positions in the overscanned area, an adjustment means for adjusting the correction data in the frame memory so as to coincide these photo detectors with the adjustment patterns, and a memory for memorizing first adjusted data which are obtained when the convergence on the entire screen of the display is adjusted and second adjusted data which are obtained by the adjustment means just after the convergence on the entire screen of the display is adjusted are provided and third adjusted data which are obtained by the adjustment means when misconvergence is generated after first and second adjustment, and recovery values are obtained in the every photo detector positions by calculation based on the second adjusted data and third adjusted data, and all correction values on the entire screen are obtained by executing an interpolation calculation based on these correction values, and it is added to the first adjusted data and memorized in the frame memory.

When misconvergence is generated, the system operates so as to move all the correction points of each projection tube to the positions on the screen before the misconvergence is generated. The position of each correction point on the screen before the misconvergence is generated is the position when the convergence is adjusted precisely beforehand.

Therefore, according to the present invention, misconvergence can be corrected precisely on the entire screen. Even when a plurality of photo detectors are arranged in the overscanned area, each photo detector includes only one inexpensive photoelectric device, so that it can be realized by a simple constitution.

The foregoing and other objects and features of the present invention will be understood from the following detailed description of embodiments in connection with the accompanying drawings.

BRIEF DESCRIPTION OF THE DRAWINGS

FIG. 6 is a drawing showing a pattern which is displayed for automatic adjustment when the main component of the convergence correction value is a keystone distortion.

FIG. 7 is a drawing showing a pattern which is displayed for automatic adjustment when the main component of the convergence correction values are a keystone distortion and a pincushion distortion.

DETAILED DESCRIPTION OF THE PREFERRED EMBODIMENTS

Figure 1:
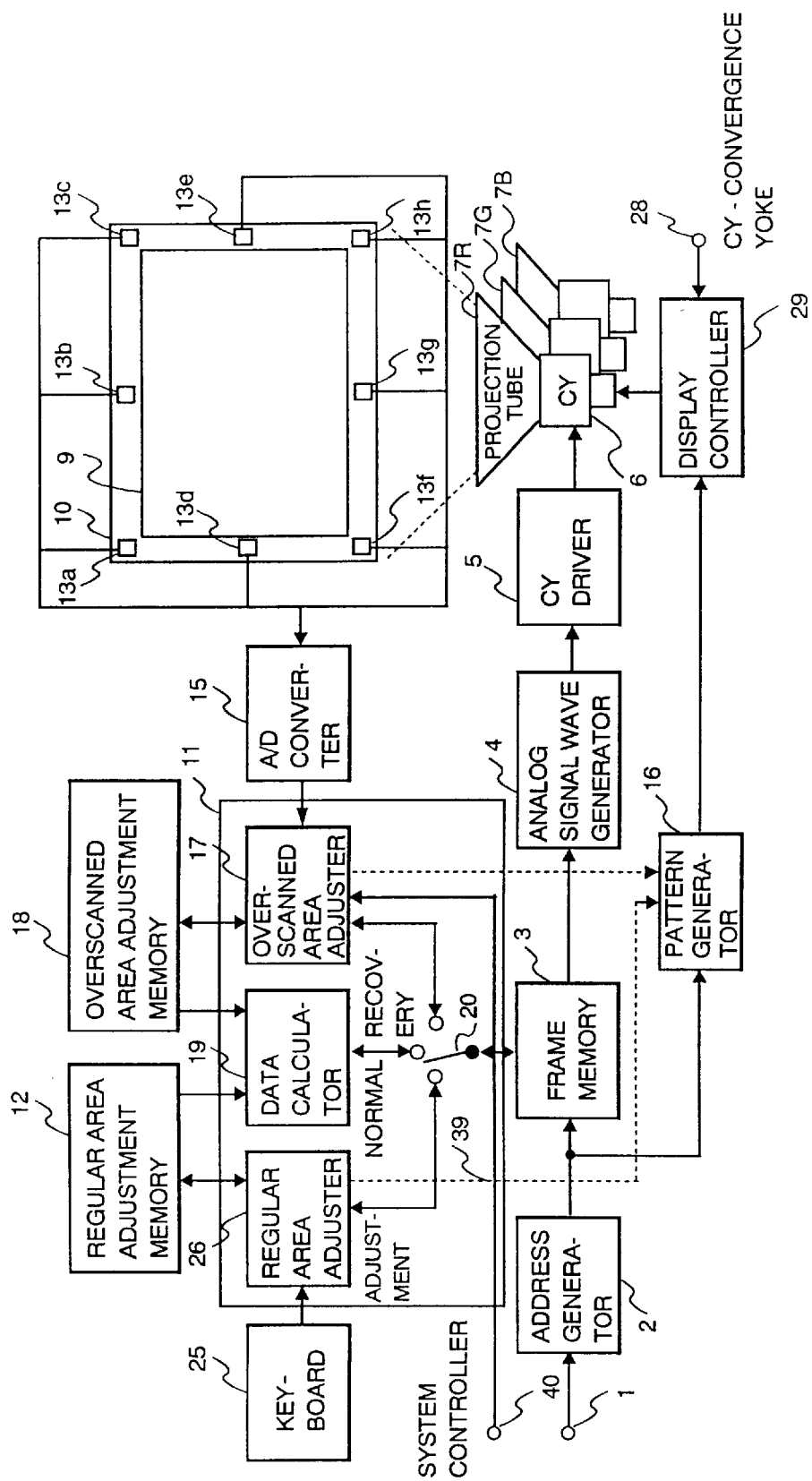
FIG. 1 is a block diagram of the first embodiment of a color projection TV set (color projection display apparatus) using a plurality of projection tubes to which a convergence correction system with recovery function of the present invention is applied.

The present invention will be explained in detail using an illustrated embodiment hereunder. FIG. 1 is a block diagram of a color projection TV set using a plurality of projection tubes to which a convergence correction system with recovery function relating to an embodiment of the present invention is applied.

In FIG. 1, a numeral 1 indicates an input terminal of a synchronizing signal, 2 an address generator (address counter) for generating an address from the synchronizing signal, corresponding to the scanning position on the screen and 3 a frame memory for memorizing data indicating a correction value (hereinafter called correction data) for correcting the convergence and a volatile memory is used in this embodiment. A numeral 4 indicates an analog signal wave generator for generating a convergence correction wave form from correction data read from the frame memory 3, 5 a CY driver for driving a convergence yoke (hereinafter called a CY), 6 a CY for generating a convergence correction magnetic field, 7R, 7G, and 7B projection tubes for projecting red, green, and blue images respectively, 9 an observation screen, 10 a raster screen projected from the projection tubes on the screen, and 12 a regular adjustment memory for memorizing correction data when the convergence on the screen 9 is adjusted and a nonvolatile memory is used in this embodiment. Numerals 13a to 13h indicate photo detectors including a photoelectric device respectively and are arranged at eight positions in the overscanned area of the screen 9 in this embodiment. As to the photo detectors 13a to 13h, at least each photoelectric device mentioned above may be arranged in the neighborhood of the overscanned area of the screen 9 and the installation location of the remaining circuit devices is optional. A numeral 15 indicates an analog to digital converter (A/D converter) for converting outputs of the photo detectors 13a to 13h to digital values respectively, 16 a pattern generator for generating an adjustment pattern, 17 an overscanned area adjuster for adjusting the convergence on the photo detector, and 18 an overscanned area adjustment memory for memorizing data adjusted by the overscanned area adjuster 17 and a nonvolatile memory is used in this embodiment. A numeral 19 indicates a data calculator for calculating new correction data, 20 a switch, 25 a keyboard, 26 a regular area adjuster for adjusting the convergence on the screen, 28 an input terminal of a video signal, and 29 a display controller.

Firstly, the outline of the convergence correction operation will be explained. The address generator 2 generates an address synchronizing with screen scanning and reads the correction data in the frame memory 3 sequentially. The analog signal wave generator 4 generates 6 kinds of convergence correction wave forms according to each position on the screen so as to correct the convergence at each of the two directions such as the horizontal and vertical direction for each of the three projection tubes 7R, 7G, and 7B (three colors) on the basis of the read correction data. These convergence correction wave forms are converted to signals to be supplied to the convergence yoke 6 by the CY driver 5 and supplied to the convergence yoke 6. The convergence yoke 6 generates a correction magnetic field according to the convergence correction wave forms and the convergence on the display apparatus is corrected.

Figure 2:
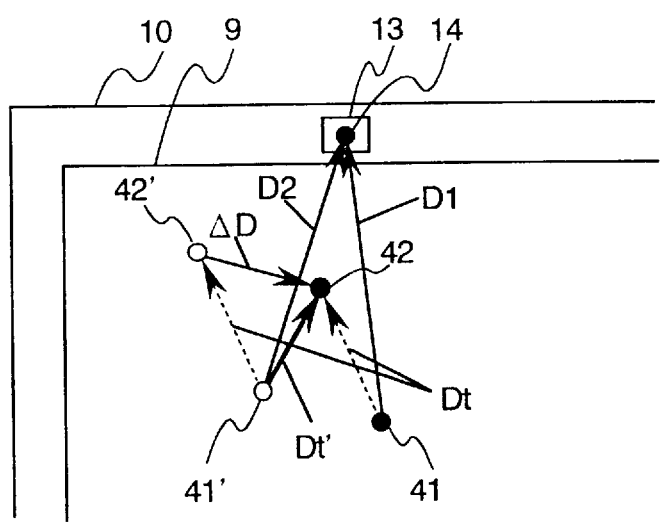
FIG. 2 is a diagram for explaining the convergence recovery principle of the present invention.

Next, the principle of the convergence recovering method of the present invention will be explained with reference to FIG. 2. FIG. 2 is a drawing showing an example of an image projected from a specific projection tube in a projection TV set.

In FIG. 2, a numeral 14 indicates a photoelectric device of a photo detector 13 and 41 a certain correction position (hereinafter called a correction point P) on the screen and particularly the position on the screen when the correction data at the correction point P is zero, that is, in the non-correction state. A numeral 42 indicates the position on the screen where the correction point P moves to by the correction data Dt. Symbols D1, D2, ΔD, Dt, and Dt' shown in FIG. 2 indicate the vectors of the horizontal and vertical correction data. The correction point P of each of the other projection tubes also moves to the position 42 on the screen. Consequently, the position 42 is adjusted in the non-misconvergence state. Each part which performs the same operation as that shown in FIG. 1 is assigned the same number and the explanation thereof will be omitted.

It is assumed that misconvergence is generated and the positions 41 and 42 on the screen at the correction point P move to positions 41' and 42' on the screen respectively. In this case, to correct the misconvergence, it is desirable to add ΔD and move the correction point P at the position 42' on the screen to the position 42 on the screen. It is considered that this ΔD is almost equal to the correction data necessary to move the position 41' on the screen to the position 41 on the screen, so that the value thereof can be obtained as follows. Namely, assuming the correction data for moving from the position 41 on the screen to the photo detector 14 as D1 and the correction data for moving from the position 41' on the screen to the photo detector 14 as D2, the correction value ΔD of the correction data for moving from the screen position 42' to the position 42 on the screen can be obtained from ΔD=D2−D1. Therefore, the correction data Dt' for moving the correction point P from the position 41' on the screen to the position 42 on the screen can be obtained by calculating Dt'=Dt+ΔD and it can be moved to the position on the screen before the misconvergence is generated. In the same way, for the correction point P of each of the other projection tubes, the correction data for moving the correction point P to the position 42 on the screen is obtained and the misconvergence can be corrected at the position 42 on the screen by these corrections.

Next, a method for correcting the misconvergence on the entire screen by using the above principle will be described. A plurality of photo detectors 13 shown in FIG. 2 are arranged in the overscanned area shown in FIG. 1 and the correction value ΔD of convergence in each photo detector is obtained respectively according to the above principle. By executing an interpolation calculation from these correction values, the correction values (or what is equivalent to the correction vales) ΔD at all the correction. points on the entire screen can be obtained. By calculation Dt'=Dt+ΔD according to the above principle using the correction values ΔD and the preadjusted correction data Dt at all the correction points and, the correction points are moved respectively to the positions on the entire screen before the misconvergence is generated. Furthermore, the aforementioned is executed also for the other projection tubes and by moving all the correction points of all the projection tubes respectively to the positions on the screen before the misconvergence is generated, the misconvergence on the entire screen is corrected.

Next, the concrete convergence adjustment operation will be explained. There are three kinds of convergence adjustment available such as so-called normal convergence adjustment (Adjustment (1)) which is executed on the screen by an adjuster, convergence adjustment (Adjustment (2)) which is executed in the photoelectric device of the photo detector immediately after Adjustment (1), and convergence adjustment (Adjustment (3)) which is executed in the photoelectric device of the photo detector when misconvergence is generated after Adjustment (2).

Firstly, Adjustment (1) will be explained. In Adjustment (1), the switch 20 is switched to the adjustment side so as to connect the regular area adjuster 26 to the frame memory 3. The display controller 29 switches display so as to project an adjustment pattern generated by the pattern generator 16 on the screen 9. Next, the adjuster inputs a signal for convergence adjustment from the keyboard 25 with observing the adjustment pattern on the screen 9. The regular area adjuster 26 changes the correction data in the frame memory 3 on the basis of the signal inputted from the keyboard 25. The correction data in the frame memory 3 is subjected to convergence adjustment according to the aforementioned operation and the position where the correction data is changed is adjusted. The same adjustment is executed for each projection tube, in each correction direction, and at each correction position on the screen and they are made coincident with each other on the display screen 9 and adjusted so as to prevent misconvergence. Since the frame memory 3 uses a volatile memory, when the power is turned off, the data in the frame memory 3 is erased. Therefore, after Adjustment (1) ends, the correction data Dt (m, n) adjusted on the screen is memorized in the regular area adjustment memory 12 using a nonvolatile memory in which no data is erased even when the power is turned off. Symbols "m, n" indicate the positions in the horizontal and vertical directions on the screen. Since the correction data is memorized in the regular area adjustment nonvolatile memory 12, it is possible to read the correction data from the regular area adjustment memory 12 when the power is turned on and memorize the correction data in the frame memory 3. When Adjustment (1) ends, the display controller 29 switches the display and a video signal from the input terminal 28 is projected on the screen 9.

Figure 3:
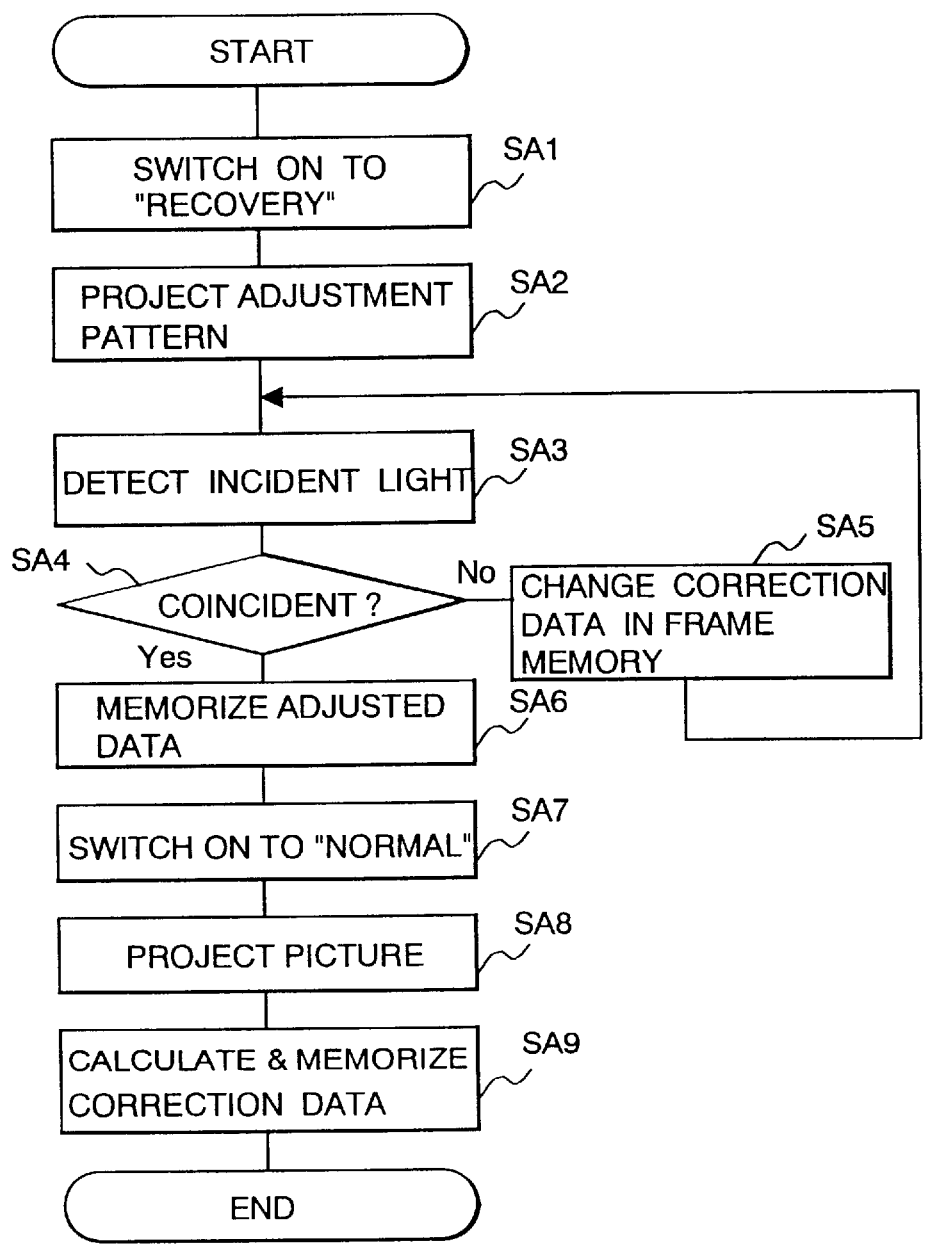
FIG. 3 is a flow chart showing the processing flow for correcting misconvergence in an embodiment of the present invention.

Next, Adjustment (2) which is executed continuously after Adjustment (1) ends will be explained. In Adjustment (2), convergence adjustment in the photoelectric device of the photo detector 13 is executed and the obtained correction data is memorized as the initial data in the overscanned area adjustment memory 18. A flow chart at this time is shown in FIG. 3. For a color projector, it is necessary to correct the convergence in each of the horizontal and vertical directions for the every image from the green, blue, and red projection tubes. They can be adjusted in the same way, so that one correction will be explained hereunder.

At Step SA1, the switch 20 is switched to the recovery side so that the correction data in the frame memory 3 can be changed by the overscanned area adjuster 17. At Step SA2, the adjustment pattern generated by the pattern generator 16 is projected by the display controller 29. At Step SA3, the output of each of the photo detectors 13$a$ to 13$h$ is converted to a digital value and fetched by the overscanned area adjuster 17. At Step SA4, the overscanned area adjuster 17 discriminates whether the adjustment patterns are coincident with the photo detectors at the eight positions. When there is an adjustment pattern which is not coincident with one of the photo detectors, the correction data in the neighborhood of the photo detector where the adjustment pattern is not coincident is changed at Step SA5, and the processing returns to Step SA3, and the above operation is iterated until the adjustment patterns are coincident with all the photo detectors. At Step SA6, the eight adjusted correction data in the neighborhood of the adjusted photo detectors are memorized in the overscanned area adjustment memory 18 as reference values D1 (k). In addition, the adjusted data are also memorized in the memory 18 as initial values of the eight correction data D2 (k). A symbol k indicates the number assigned to each photo detector 13. At Steps SA7 and SA8, the switch 20 is set to the normal side, and the projection of adjustment patterns is stopped, and a picture is displayed. At Step SA9, new correction data Dt' (m, n) is obtained by the data calculator 19. The calculation formula for obtaining the correction data is show n below (Formula 1).

$$Dt'(m,n) = Dt(m,n) + \sum_{k=1}^{i} Kt(m,n,k)\{D2(k) - D1(k)\} \quad \text{(Formula 1)}$$

In Formula 1, a symbol i indicates the number of photo detectors and the value of i in this embodiment is 8. A symbol Kt (m, n, k) indicates a constant for obtaining correction data suited to each position on the screen from the correction data in the neighborhood of the photo detector. A detailed calculation method by the data calculator 19 will be described later. According to Formula 1, D2 (k)=D1 (k) is used as an initial value in Adjustment (2), so that new correction data Dt' (m, n) is equal to the correction data of the regular area adjustment memory 12, that is, the data Dt (m, n) free of misconvergence which is adjusted in Adjustment (1). This correction data is memorized in the frame memory 3 and Adjustment (2) ends. Adjustment (3) which is executed when misconvergence is generated on the display screen after Adjustment (2) will be explained hereunder. Adjustment (3) is executed by an operation which is almost similar to that of Adjustment (2). A difference from the above explanation of the operation is the memory method for correction data at Step SA6. In Adjustment (2), the correction data when the convergence is adjusted on the photo detectors is memorized as D2 (k)=D1 (k) respectively. In Adjustment (3), the obtained data is memorized only as D2 (k) in the overscanned area adjustment memory 18. Therefore, from a value indicating the difference between the correction data D1 (k) before misconvergence is generated and the correction data D2 (k) after it is generated, that is, the recovery data on each photo detector, correction data suited to each position on the screen is obtained on the screen and added to the correction data on the entire screen so as to recover the mislocation. This recovery of mislocation is executed in both of the horizontal and vertical directions of each projection tube and the misconvergence is recovered dynamically. The correction data in the frame memory 3 is lost when the power is turned off. However, when the power is turned on, the correction data is calculated by the data calculator 19 again, memorized in the frame memory 3, and set to the correction data before the power is turned off.

Figure 4:
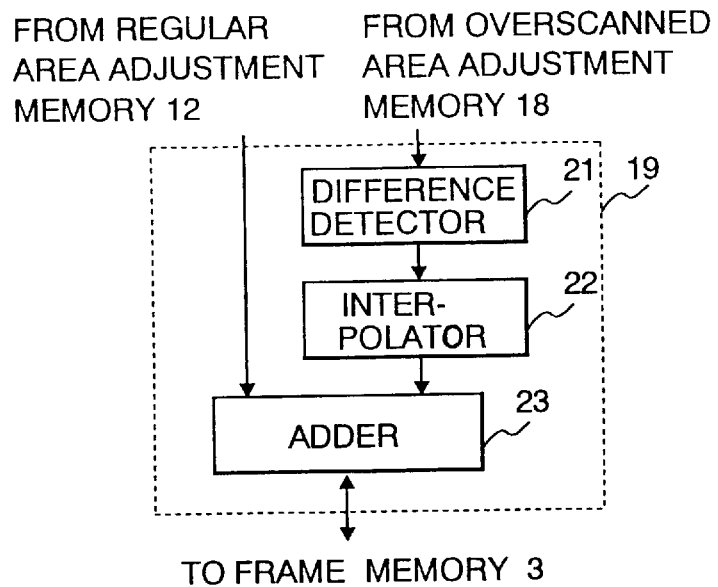
FIG. 4 is a block diagram of the data calculator shown in FIG. 1.

Next, a detailed calculation method by the data calculator 19 in Adjustment (2) and Adjustment (3) will be described. FIG. 4 is a drawing showing the constitution of the data calculator 19 which calculates Formula 1 mentioned above.

In FIG. 4, a numeral 21 indicates a difference detector for calculating the recovery data in the neighborhood of the photoelectric device of each photo detector based on the recovery data memorized in the overscanned area adjustment memory 18, 22 an interpolator for calculating the correction data on the entire screen from the recovery data in the neighborhood of the photoelectric device of each photo detector which is calculated by the difference detector 21, and 23 an adder for adding the recovery data on the entire screen to the correction data in the regular area adjustment memory 12 and memorizing the sum in the frame memory 3.

Firstly, both of the correction data D2 (k), which is the result of the adjustment on the photoelectric device of each photo detector and the correction data D1 (k), which is memorized as an initial value, are read from the overscanned adjustment memory 18 and inputted in the 21. The difference detector 21 takes a difference between the correction data D1 (k) and D2 (k), each corresponding to the same photo detector (the same value of k) and obtains the recovery data D2 (k)–D1 (k) in the neighborhood of the photoelectric device of the photo detector. The interpolator 22 performs an interpolation calculation based on the recovery data in the neighborhood of the photo detector and obtains the correction data on the entire screen. This interpolation calculation method will be explained by referring to FIG. 5.

Figure 5:
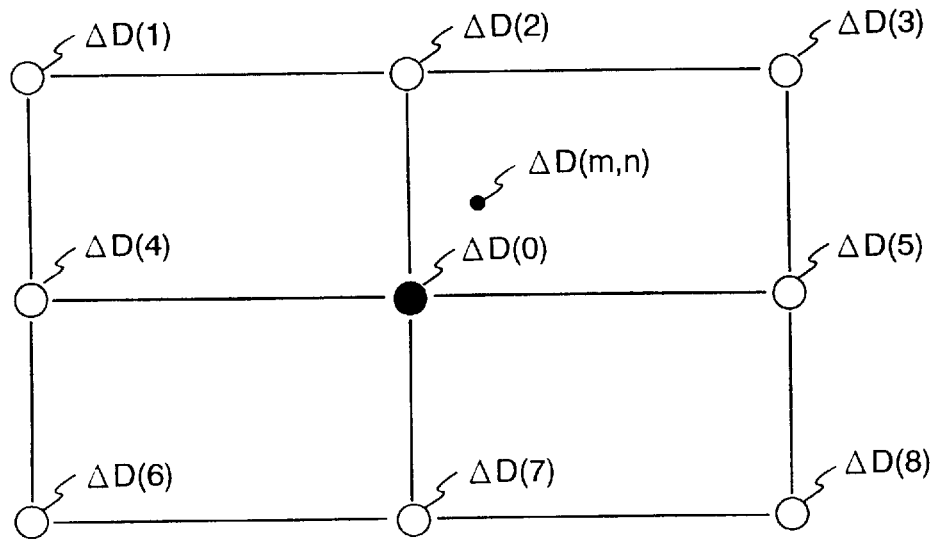
FIG. 5 is a drawing for explaining a method for obtaining correction data for misconvergence on the entire screen in an embodiment of the present invention.

FIG. 5 is a drawing for explaining a method for obtaining the correction data ΔD (m, n) at any position on the entire screen using the constant Kt (m, n, k) in Formula 1 mentioned above. In FIG. 5, symbols ΔD (1) to ΔD (8) indicate recovery data in the neighborhood of the photoelectric devices of the photo detectors, ΔD (0) recovery data in the middle of the screen, and ΔD (m, n) recovery data on the entire screen. The recovery data ΔD (0) in the middle of the screen can be obtained, for example, by calculating:

ΔD(0)=0.5×ΔD(2)+0.5×ΔD(7), or

ΔD(0)=0.5×ΔD(4)+0.5×ΔD(5).

By using the recovery data in the neighborhood of the photoelectric devices and in the middle of the screen, the sum of all products of the recovery data ΔD (k) and the calculation constant (interpolation constant) Kt (m, n, k) are calculated and the recovery data ΔD (m, n) on the entire screen is obtained. The adder 23 adds the correction data ΔD (m, n) on the entire screen obtained by the interpolator 22 and the correction data Dt (m, n) memorized in the regular area adjustment memory 12 so as to obtain new correction data Dt' (m, n) and memorizes it in the frame memory 3. As explained above, the recovery data interpolated for each position on the screen can be added to respective correction data, so that the misconvergence on the entire screen can be corrected.

We can use a microcomputer as a system controller 11 to realize the same function of the overscanned area adjuster 17, the data calculator 19, the regular area adjuster 26, and the switch 20 shown in FIG. 1. Even if the keyboard 25 and the regular area adjuster 26 are removed from the main unit of the display apparatus after the convergence adjustment (Adjustment (1)) on the display screen 9 finished, the same effect can be produced. In addition, instead of the correction data D1 (k) and D2 (k) we can memorize the difference from the correction data, which is in the regular area adjustment memory 12, in the overscanned area adjustment memory 18, to get the same effect. Furthermore, by memorizing only the representative of the correction data in the frame memory 3 in the regular area adjustment memory 12 and installing an interpolation calculator in the overscanned area adjuster 17, the data calculator 19, and the regular area adjuster 26, for calculating the correction data to be memorized in the frame memory 3 on the basis of the representative data the same effect can be produced.

It is also possible to memorize the calculation result of the data calculator 19 in an area different from the area used to memorize the result of Adjustment (1) in the regular area adjustment memory 12, read the calculation result when the power is turned on, and memorize it in the frame memory 3.

In the aforementioned embodiment, the projection display apparatus is described so as to ensure easy understanding. However, the present invention can be applied to CRT display apparatuses such as all color TV sets and displays having built-in digital convergence correctors. By arranging a photo detector only at a position in the overscanned area, obtaining the correction data at this position, and using it as correction data at all positions on the screen, static misconvergence can be corrected.

Next, the display method of the first pattern displayed by the automatic adjustment in Adjustment (2) and Adjustment (3) will be explained by referring to FIGS. 6 and 7. FIGS. 6 and 7 are drawings showing the relationship between the display areas of patterns which are displayed for the automatic adjustment in Adjustment (2) and Adjustment (3) when the main component of the convergence correction value is a keystone distortion and a keystone distortion, and pincushion distortion respectively and the photoelectric devices of the photo detectors 13a to 13h.

In FIGS. 6 and 7, (a) is a drawing when the adjustment patterns used in Adjustment (2) and Adjustment (3) are schematically displayed in the state that the convergence is precisely adjusted on the display screen 9 by Adjustment (1). (b) is a drawing showing the situation when the automatic convergence adjustment in Adjustment (2) and Adjustment (3) is executed using the adjustment patterns shown in (a). As shown in FIGS. 6(a) or 7(a), the adjustment patterns used for automatic adjustment in the neighborhood of the photoelectric devices of the photo detectors 13a and 13f or 13a, 13c, 13f, and 13h, which are projected toward outer side of the screen because of the keystone distortion and the pincushion distortion, are set slightly toward the middle of the screen. As a result, in Adjustment (2) and Adjustment (3), as shown in FIGS. 6(b) and 7(b), the shape of the scanning area 10 is close to the status at the time of non-correction of convergence. The convergence correction wave form at this time, that is, the convergence yoke current flowing through the yoke coil of the convergence yoke 7 is a wave form having a little of steep change. The output voltage of the convergence yoke driver 5 for driving this current is a differential value of the convergence current. Since the convergence yoke current has a little of steep change, the supply voltage necessary for the convergence driver 5 lowers as the shape of the scanning area comes near the status of non-correction of convergence. Therefore, the supply voltage necessary for automatic adjustment can be lowered and the price of the system can be reduced.

Figure 8:
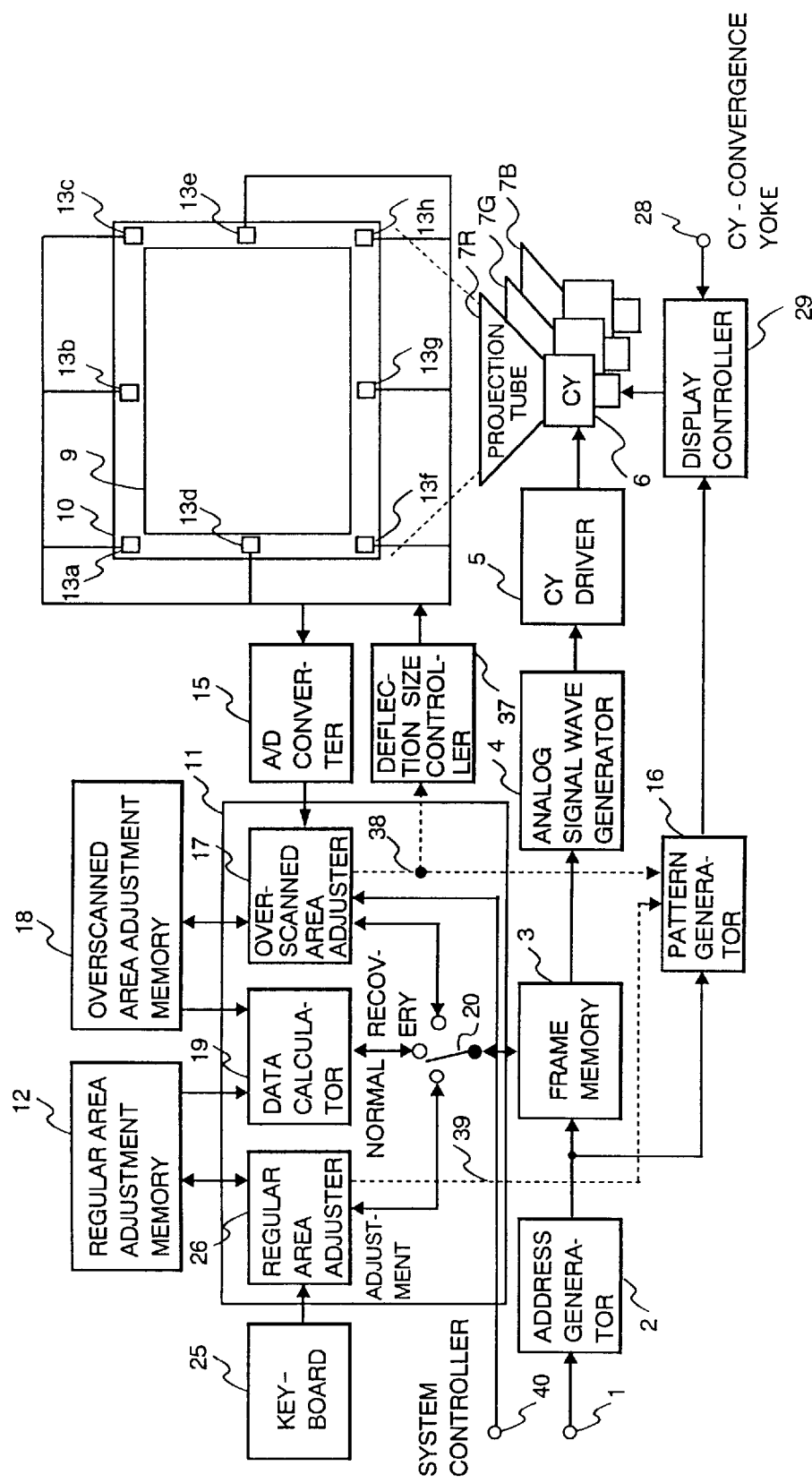
FIG. 8 is a block diagram of the second embodiment of a color projection TV set using a plurality of projection tubes to which a convergence correction system with recovery function of the present invention is applied.

Next, the second constitution of the aforementioned convergence system for correcting misconvergence will be described. FIG. 8 is a block diagram of the second embodiment of a color projection TV set using a plurality of projection tubes to which a digital convergence system for correcting misconvergence is applied.

Differences in FIG. 8 from the constitution shown in FIG. 1 are that a signal line from the overscanned area adjuster 17 to a deflection size controller 37 and the deflection size controller 37 are added. The other numerals are the same as those shown in FIG. 1, so that the explanation thereof will be omitted. When a start instruction of Adjustment (2) or (3) is inputted from the input terminal 1, a signal for enlarging the deflection size is outputted from the overscanned area adjuster 17 to the deflection size controller 37. When the signal is inputted to the deflection size controller 37, the controller enlarges the deflection size to the predetermined one. Thereafter, the automatic adjustment is executed according to the aforementioned adjustment method. When the automatic adjustment ends, a signal for returning the deflection size to the original one is outputted from the overscanned area adjuster 17. When the signal is inputted to the deflection size controller 37, the controller returns the deflection size to the original one and the adjustment operation ends.

Figure 9:
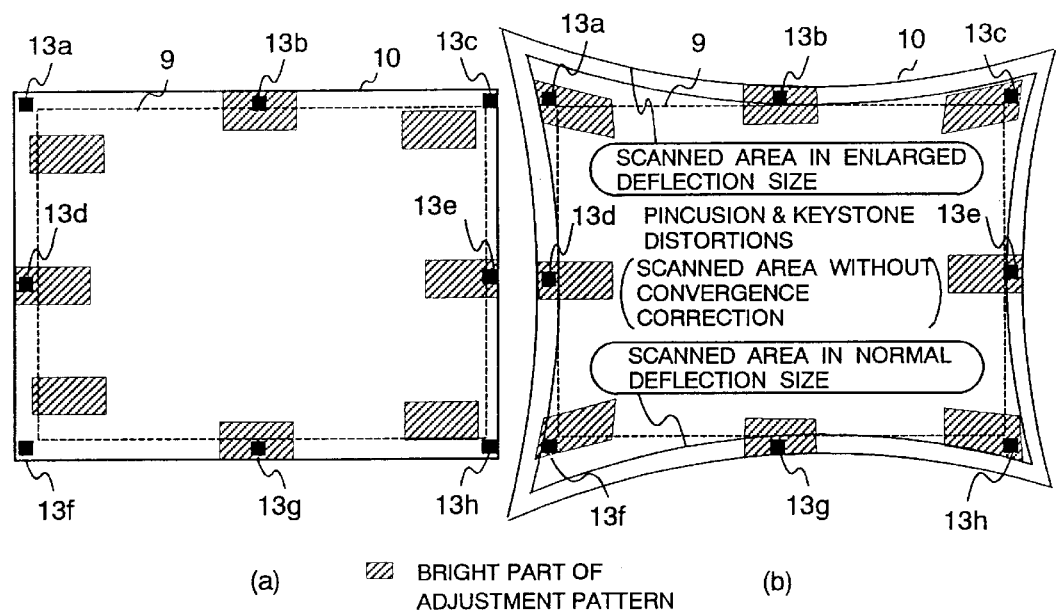
FIG. 9 is a drawing showing an adjustment pattern when the deflection size is enlarged to the predetermined one for automatic adjustment.

FIG. 9 is a drawing showing an adjustment pattern when the deflection size is enlarged to the predetermined one for automatic adjustment. In FIG. 9, the projection positions of the adjustment patterns in the neighborhood of the photoelectric devices of the photo detectors 13a to 13h should be changed according to the aforementioned keystone distortion or pincushion distortion. When the adjustment patterns and the photoelectric devices of the photo detectors 13a to 13h coincide with each other as shown in FIG. 9(b), the shape of the scanning area is close to the status of non-adjustment of convergence and the convergence wave form during automatic adjustment can be controlled to a small amplitude necessary almost only for the misconvergence correction. Therefore, if a supply voltage for the convergence yoke driver 5 is determined to the voltage necessary only for adjustment (1), the automatic adjustment will be continued successfully without the lack of the dynamic range (or supply voltage) of the convergence yoke driver 5. The projection positions of the adjustment patterns in the neighborhood of the photoelectric devices of the photo detectors 13a to 13h need not be changed according to the aforementioned keystone distortion or pincushion distortion, if the supply voltage is not exhausted during automatic adjustment.

In the aforementioned digital convergence system for correcting misconvergence, the positions of adjustment patterns are described in relation to the deflection distortion and projection distortion such as the pincushion distortion and keystone distortion. However, the projection positions can be changed also according to another distortion which is unique to an apparatus to which this system is applied. In the above explanation, the pattern position is changed beforehand. However, to prevent the supply voltage from being exhausted during automatic adjustment, it is possible to automatically adjust the pattern position using a photoelectric device. Movement of the pattern position and enlargement of the deflection size may cause an error in the convergence correction value ΔD. Therefore, it is desirable to find the sutiable constant Kt (m, n, k) in Formula 1 mentioned above for reducing this error.

Figure 10:
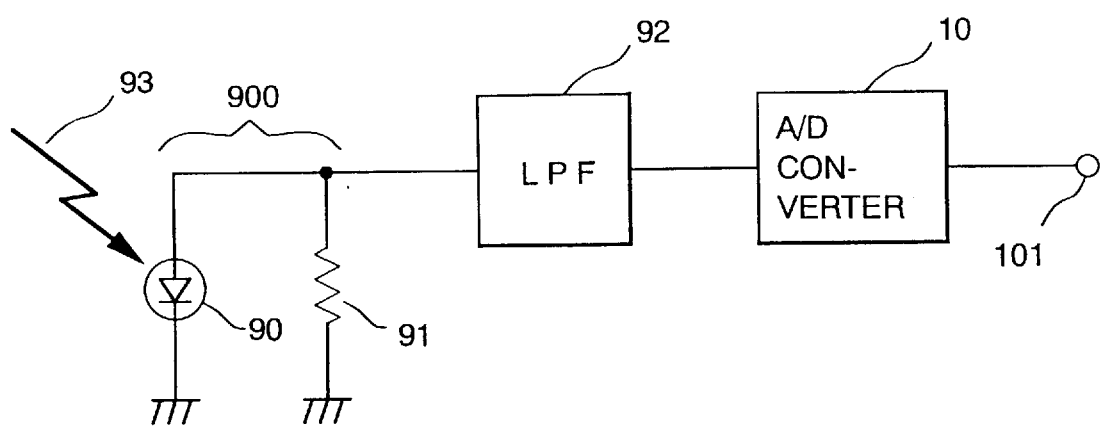
FIG. 10 is a circuit diagram showing a first constitution example of a photo detector.

FIG. 10 is a circuit diagram showing a first constitution example of a photo detector. A numeral 90 indicates a solar cell made of amorphous silicon, 91 a load resistor, and 92 a low-pass filter (hereinafter abbreviated to LPF). A numeral 900 indicates a photo detector converter consisting of the solar cell 90 and the load resistor 91. When light 93 is radiated on the solar cell 90, the solar cell 90 generates light electromotive force, so that the voltage indicating the light incident amount can be taken out from the load resistor 91. When a photo detector is used in a projection TV set, light is radiated on the solar cell 90 only for the short period in a field because of scanning. Therefore, the output of the photo detector is high for the short light incident the period and is low for the other period, so that it is difficult to detect light because the output should be sampled in a specific timing. Therefore, the output wave form of the photo detector is smoothed by using the low-pass filter LPF92 and a system which is permissive for a change of the detection timing is realized. The output of LPF92 is converted to digital data 101 by an A/D converter 10 and inputted to the overscanned area adjuster 17 (FIGS. 1 and 8).

Figure 11:
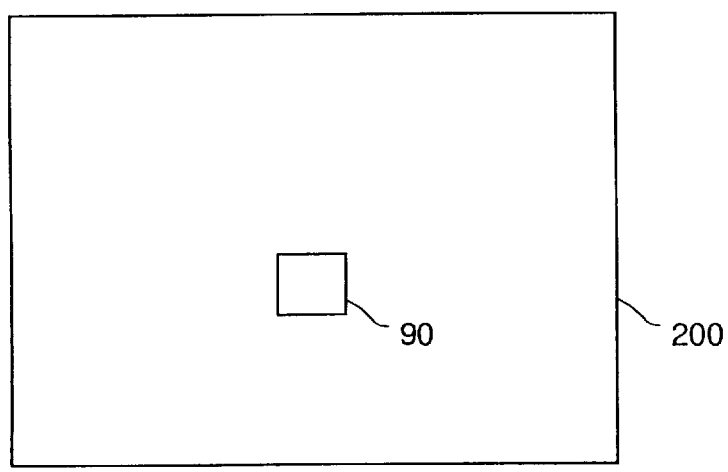
FIG. 11 is a drawing showing an first example of the display pattern for detecting the maximum output voltage of a solar cell.
Figure 12:
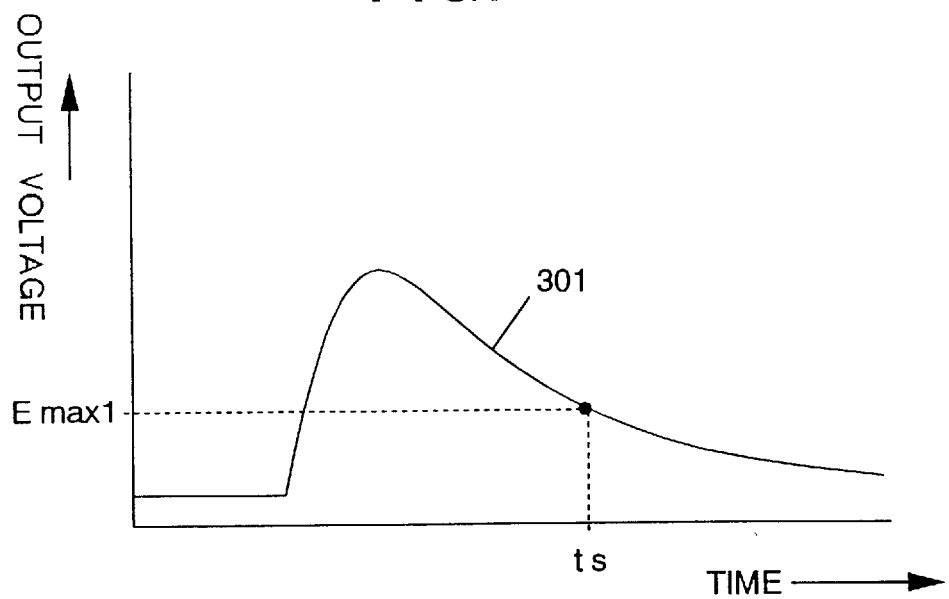
FIG. 12 is a drawing showing a first example of a time characteristic of the output voltage of a solar cell.

FIG. 11 is a drawing showing a first example of the display pattern for detecting the maximum detection voltage and an illustration showing the situation that the solar cell 90 is located within a window pattern 200 which is sufficiently large. FIG. 12 is a drawing showing a first example of a time characteristic of the output voltage of LPF92 shown in FIG. 11 and an illustration showing the situation of A/D conversion. A numeral 200 shown in FIG. 11 indicates a window pattern (monochromes of red, green, and blue) having almost constant inner brightness and a numeral 301 shown in FIG. 12 indicates an output voltage wave form of LPF92 shown in FIG. 11. The solar cell 90 is rectangular (or square) and installed so that the sides thereof are horizontal or vertical. in FIG. 12, when scanning lines pass on the solar cell 90, the output voltage increases and thereafter attenuates slowly due to the afterglow of the phosphor of the projection tubes and the effect of LPF92. It is assumed that the detection (or sampling) timing through the A/D converter 10 is ts and the detection voltage at that time is the maximum detection voltage Emax1. By performing this operation for the window pattern of each monochrome of red, green, and blue, the maximum detection voltage Emax1 can be obtained for each color.

Figure 13:
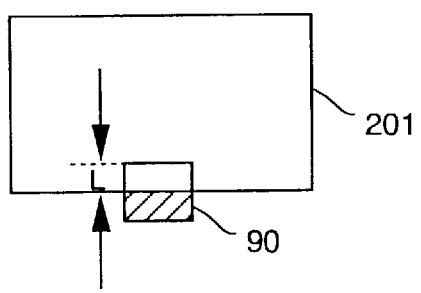
FIG. 13 is a drawing showing the shape of a solar cell and a first example of the display pattern for adjustment.

FIG. 13 is a drawing showing the shape of a solar cell and a first example of the display pattern for adjustment and a diagram for explaining an example of position detection by the solar cell 90. A numeral 201 indicates a window pattern for position detection and the brightness thereof is the same as that of the window pattern 200 shown in FIG. 11. A symbol L indicates a length of the solar cell 90 (hereinafter called a light reception length) located within the window pattern 201.

Figure 14:
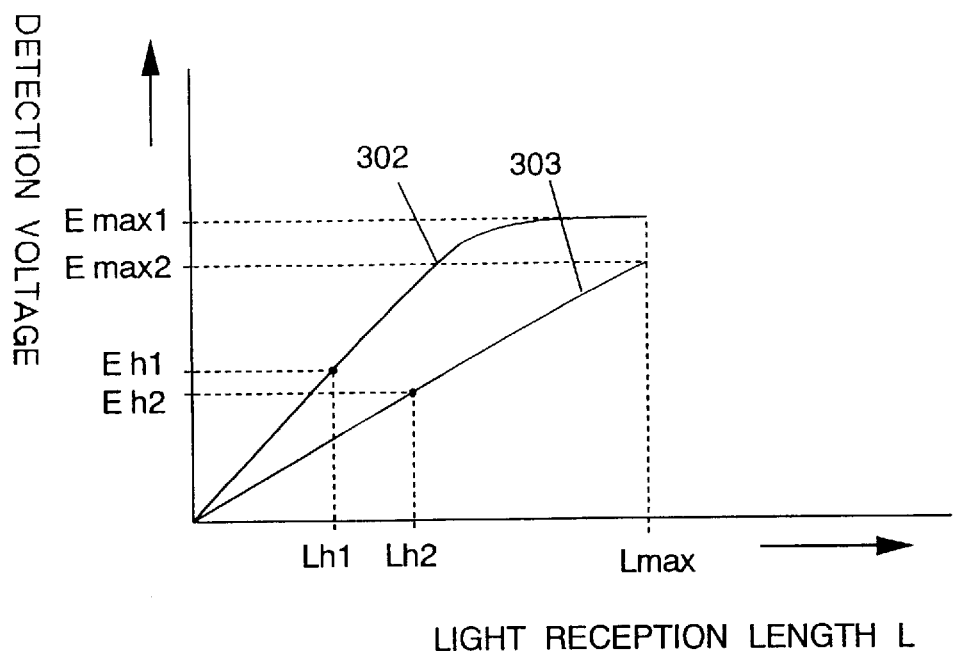
FIG. 14 is a drawing showing a first example of the relationship between the light reception length L of a solar cell and the output voltage.

FIG. 14 is a drawing showing a first example of the relationship between the light reception length L of a solar cell and the detection voltage. The detection voltage varies with the characteristics (the shape and size included) of the solar cell 90, the load resistor 91, and the conditions of the window pattern such as the light intensity. A numeral 302 indicates the voltage which is detected when the load resistance 91 is comparatively high and 302 the voltage which is detected when the load resistance 91 is comparatively low. When the solar cell 90 is located completely within the window pattern as shown in FIG. 11, the detection voltage is maximum. It is assumed that the light reception length when the solar cell 90 is located just within the window pattern is Lmax and the detection voltages 302 and 303 are Emax1 and Emax2 respectively. In this embodiment, intermediate brightness is used for position detection by overscanned area adjuster 17. Namely, when the detection voltages (Eh1, Eh2) at the predetermined rate (for example, 50%) for the maximum detection voltages Emax1 and Emax2 are detected, it is judged that the boundary (edge) of the window pattern coincides with the solar cell 90. It is desirable to adjust the correction data so that the detection voltages become the threshold voltage Eh1 and Eh2. Consequently, the detection data are normalized. In FIG. 13, it is premised for explanation that adjustment in the vertical direction is executed. However, also in the horizontal direction, the edge of the window pattern can be detected exactly in the same way. The light reception lengths are assumed as Lh1 and Lh2 when the detection voltages become the threshold voltage Eh1 and Eh2.

Figure 15:
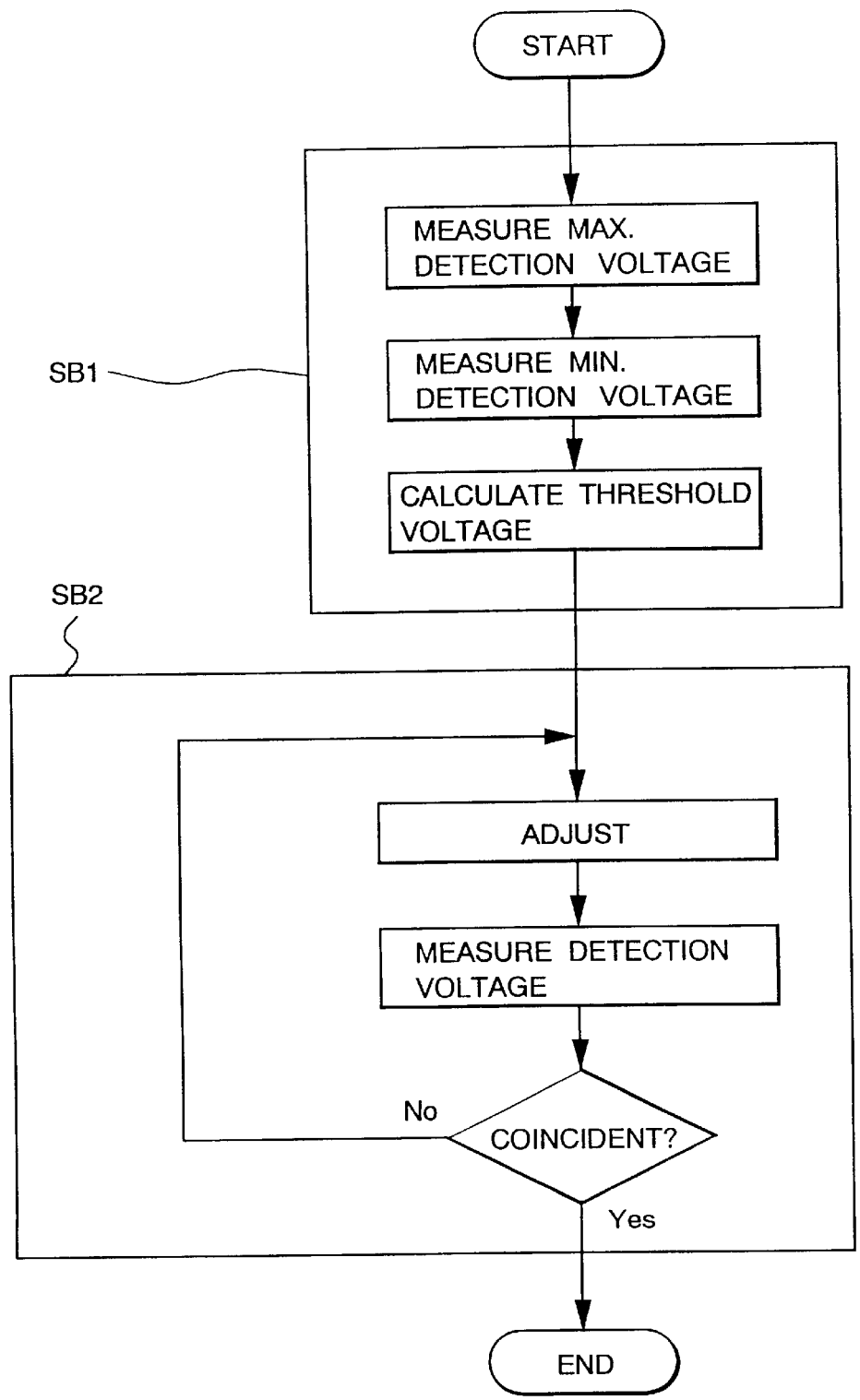
FIG. 15 is a drawing showing a first example of automatic adjustment flow by each photo detector.

FIG. 15 is a drawing showing a first example of automatic adjustment flow by each photo detector and a flow chart of automatic adjustment executed using the photo detectors 13a to 13h actually in a system as shown in FIG. 1 or 8. Step SB1 is a stage of normalization. The maximum detection voltage is measured using a sufficiently large window pattern as shown in FIG. 11, and then the minimum detection voltage is measured in the state that nothing is displayed, and an detection voltage at the predetermined rate (for example, a detection voltage which is the average of the maximum detection voltage and the minimum detection voltage) is obtained by calculation from these two measured data. In the explanation of FIG. 14, the minimum detection voltage is ignored as 0 for simplicity. Precisely, it is necessary to take the minimum detection voltage also into account. Step SB2 is a stage of adjustment. Adjustment is executed, and the detection voltage is measured, and it is checked whether the detection voltage is equal to the threshold voltage obtained at Step SB1 or not. When the detection voltage is equal to it or the difference is small enough within the tolerance, it is considered that the solar cell 90 coincides with the edge of the window pattern and the adjustment ends. When the difference is larger than the tolerance, it is considered that the adjustment is not settled and the adjustment is continued. In the flow chart shown in FIG. 15, one-dimensional adjustment is explained. Actually, two-dimensional adjustment in the horizontal and vertical directions is necessary. Therefore, at Step SB2 which is a stage of adjustment, it is necessary to execute both of horizontal adjustment and vertical adjustment.

According to this embodiment, by using the window pattern, even when the photo detector is so inexpensive that it detects only the light intensity, the direction in which the projected image is shifted can be detected by the detection voltage compared with the threshold voltage thereof. Therefore, even when a plurality of photo detectors are used, an inexpensive automatic adjustment system having a simple constitution can be realized. By normalizing the detection voltage, coincidence between the window pattern edge and the photo detectors can be detected stably for a change in the brightness of the window pattern, a change in the characteristics of the photo detectors, and degradation of the phosphor of the projection tubes, so that a highly precise system can be realized.

In FIG. 10, the photo detector uses a rectangular solar cell using amorphous silicon. The reason is that the solar cell is sufficiently sensitive to the three primary colors of red, green, and blue and suited to this system, and a sufficient voltage output is obtained without using a power supply unit, and the constitution is simplified. Any material which is sufficiently sensitive to the three primary colors of red, green, and blue may be used. A photodiode or a phototransistor can be used instead of a solar cell without trouble.

Figure 16:
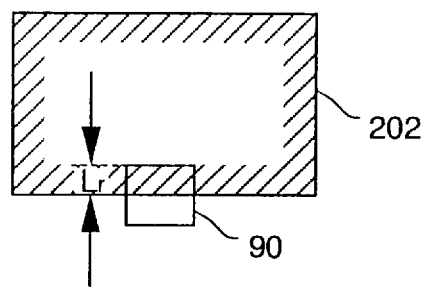
FIG. 16 is a drawing showing the shape of a solar cell and a second example of the display pattern for adjustment.

FIG. 16 is a drawing showing the shape of a solar cell and a second example of the display pattern for adjustment and an illustration showing another example of coincidence detection by the solar cell 90. In this example, the coincidence between the window pattern edge and the photo detectors is detected using a black window pattern 202.

A symbol Lr indicates a length of the solar cell 90 (hereinafter called a non-light reception length) located within the black window pattern 202.

Figure 17:
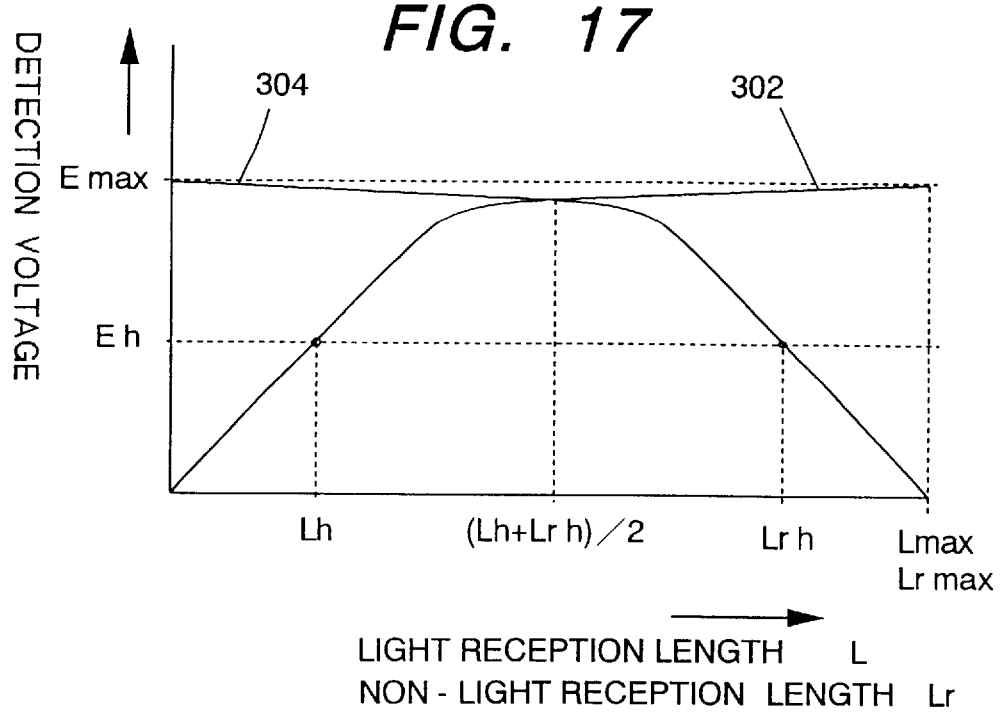
FIG. 17 is a drawing showing a relationship example between the light reception length L and the non-light reception length Lr of a solar cell and the output voltage.

FIG. 17 is a drawing showing a relationship example between the light reception length L and the non-light reception length Lr of a solar cell and the detection voltage and an illustration showing a method for detecting coincidence between the photo detector and the window pattern precisely by combining edge detection with the normal window pattern shown in FIG. 13 and edge detection with the black window pattern 202 shown in FIG. 17. A numeral 302 indicates the characteristic of the same numeral shown in FIG. 14. A numeral 304 indicates the relationship between the non-light reception length Lr shown in FIG. 16 and the detection voltage. A symbol Lrh indicates a non-light reception length which is obtained when adjustment is executed using the window pattern 202 shown in FIG. 16 and the detection voltage becomes the predetermined rate Eh for the maximum. If the brightness outside the black window pattern shown in FIG. 16 is equal to the brightness inside the normal window pattern shown in FIG. 13 and the characteristics of the solar cell 90 are equal, the maximum detection voltage Emax of the characteristic 302 is equal to that of the characteristic 304 and the maximum light reception length Lmax is equal to the maximum non-light reception length Lrmax. It is expected that the characteristic 302 and the characteristic 304 are symmetrical about (Lh+Lrh)/2. Correction data which is obtained when adjustment is executed with the normal window pattern as shown in FIG. 13 and the detection voltage is equal to Eh and correction data when adjustment is executed with the black window pattern as shown in FIG. 16 and the detection voltage is equal to Eh are different from each other. Therefore, the average value of these two correction data is used as correction data which is obtained when the virtual adjustment pattern coincides with the photo detector.

The value (Lh+Lrh)/2 is stable for changes in the characteristics of the solar cells 90 and the brightness of the window pattern, therefore, this system enables highly reliable coincidence detection compared with a case using only the one-sided edge as shown in FIG. 14. In addition, there is no problem, whether the display position (edge position) of the black window pattern 202 shown in FIG. 16 can be different from or coincide with the display position (edge position) of the window pattern 201 shown in FIG. 13. In place of the window pattern 202 shown in FIG. 16, it is possible to shift the phase of the window pattern 201 shown in FIG. 13 and use the upper edge of the window pattern 201 without trouble.

Figure 18:
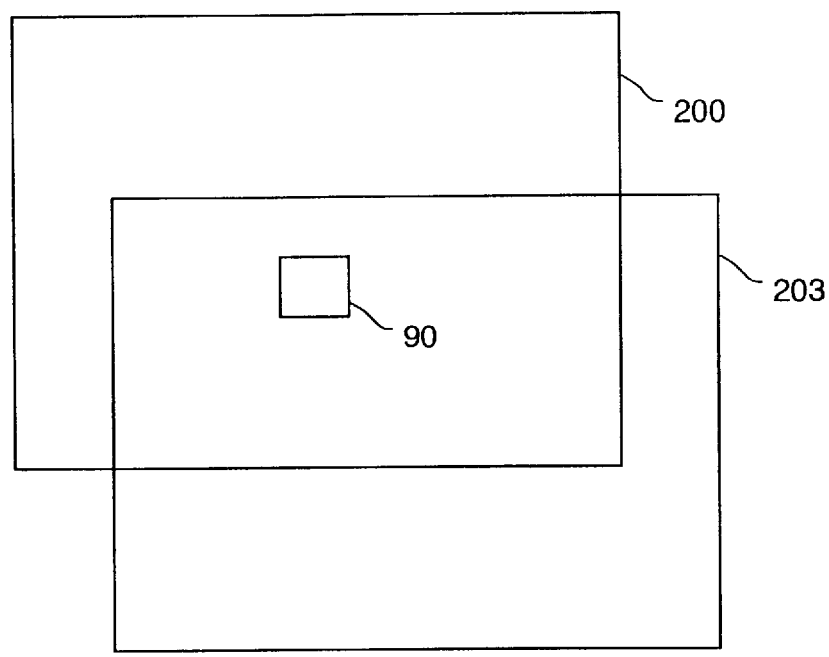
FIG. 18 is a drawing showing an second example of the display pattern for detecting the maximum output voltage of a solar cell.

Next, problems and countermeasures in a system explained in FIGS. 14 and 15 will be explained. FIG. 18 is a drawing showing an example of the second display pattern for detecting the maximum detection voltage. A sufficiently large window pattern is displayed so as to measure the maximum detection voltage Emax of the solar cell 90. The same window pattern which is expected to be displayed on the same scanning lines may be displayed at an area of 200 or displayed at an area of 203 depending on the mislocation (misconvergence) on the screen during the adjustment process.

Figure 19:
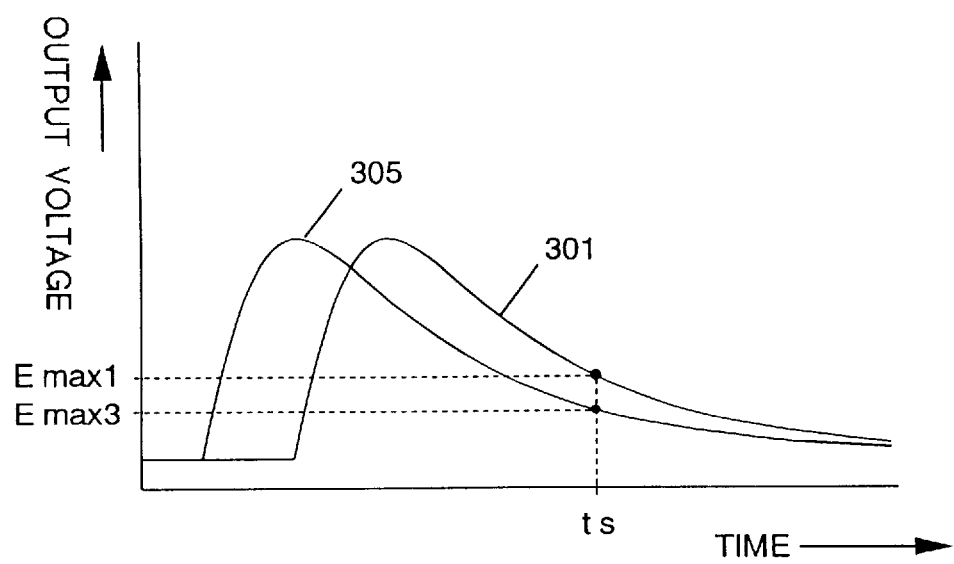
FIG. 19 is a drawing showing a second example of a time characteristic of the output voltage of a solar cell.

FIG. 19 is a drawing showing a second example of a time characteristic of the output voltage of LPF92 shown in FIG. 11 and an illustration for FIG. 18. Numerals 301 and 305 indicate output voltage wave forms of LPF92 when the window patterns 200 and 203 are projected respectively. Since scanning lines passing on the solar cells 90 are different, a time lag is generated between the output voltage wave forms 301 and 305. However, the timing ts for detecting the output voltage is constant, so that the each maximum detection voltage of Emax1 and Emax3 (the output voltage which is obtained when light is radiated on the overall surface of the solar cell) thereof is different from each other. Scanning lines passing the solar cell 90 in the process of adjustment are changed like this. Therefore, by a method that the detection voltage is normalized first as shown in FIG. 15 and then adjusted on the basis of the normalization information, a point where the detection voltage becomes at the predetermined rate cannot be detected precisely because the maximum detection voltage is changed halfway. Particularly in the initial stage of adjustment where the changing amount is large, the effect appears remarkably. Examples of adjustment flow for avoiding this problem are shown in FIGS. 20 and 21.

Figure 20:
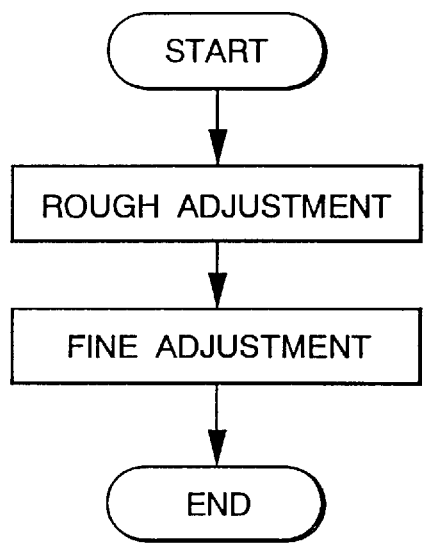
FIG. 20 is a drawing showing a second example of automatic adjustment flow by each photo detector.

FIG. 20 is a drawing showing a second example of automatic adjustment flow by each photo detector and a flow chart of a 2-stage normalization adjustment algorithm wherein the entire adjustment flow is divided into rough adjustment and fine adjustment. Each of rough adjustment and fine adjustment has an internal flow equivalent to the adjustment flow shown in FIG. 15 and only the amount in each adjustment step and the tolerance in the coincidence discrimination between the threshold voltage and the detection voltage during adjustment are different. Therefore, normalization is executed once at the start of rough adjustment, and the adjustment is changed to fine adjustment when the adjustment progresses to a certain extent and scanning lines passing the solar cell 90 are not changed so much, and normalization is executed again at the start of this fine adjustment. Since scanning lines passing the solar cell 90 at the time when the adjustment is completed perfectly, are not so different from those at the time when the second normalization is executed and the detection voltage of the solar cell 90 at the time of adjustment completion is at the predetermined rate considerably precisely and coincidence between the adjustment pattern and the solar cell 90 can be detected stably.

Figure 21:
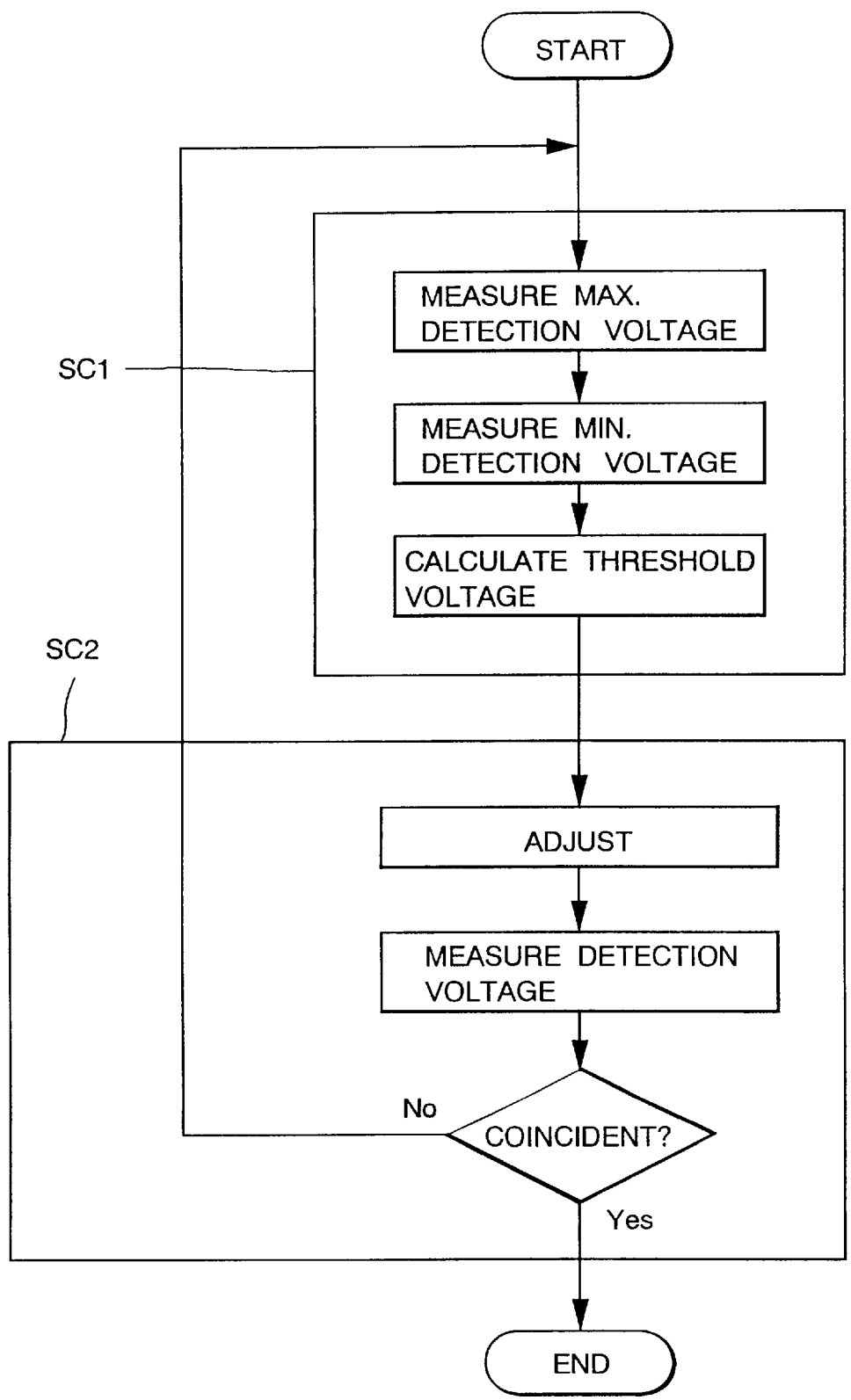
FIG. 21 is a drawing showing a third example of automatic adjustment flow by each photo detector.

FIG. 21 is a drawing showing a third example of automatic adjustment flow by each photo detector and a flow chart of a successive normalization algorithm which executes normalization every a little of adjustment. Since the flow is almost similar to that shown in FIG. 15, the explanation of the same parts is omitted and only the different parts will be explained. A difference from FIG. 15 is that whenever the adjustment is not sufficient and it is discriminated that the difference is not within the tolerance, the normalization is retried starting from Step SC1. Namely, the flow is a flow of sequential iteration of normalization, adjustment, and coincidence discrimination. Even when scanning lines passing the solar cell 90 are changed due to adjustment, normalization is executed every time, so that stable coincidence detection is possible.

Figure 22:
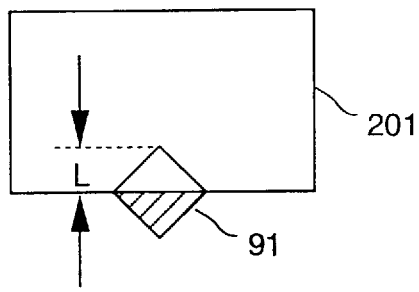
FIG. 22 is a drawing showing the shape of a solar cell and a third example of the display pattern for adjustment.
Figure 23:
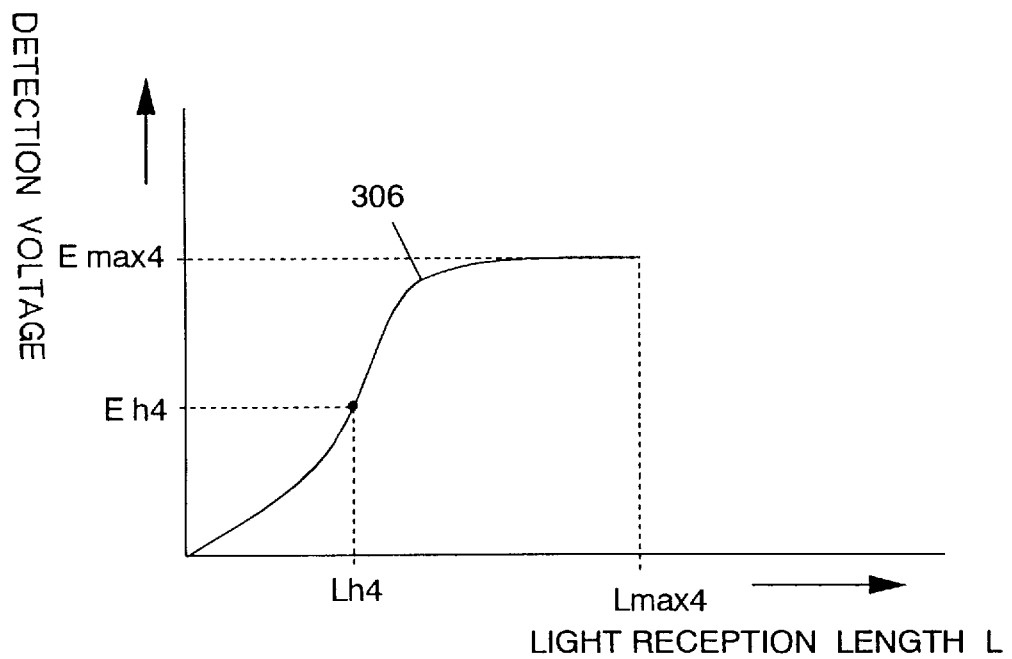
FIG. 23 is a drawing showing a second example of the relationship between the light reception length L of a solar cell and the output voltage.

FIG. 22 is a drawing showing the shape of a solar cell and a third example of the display pattern for adjustment and indicates an example that the shape and installation method of the solar cell are changed from that in FIG. 5. A solar cell 91 is diamond (or square) and is installed so that the diagonal lines are horizontal and vertical. FIG. 23 is a drawing showing a second example of the relationship between the light reception length L of a solar cell and the detection voltage corresponding to FIG. 22. Although the maximum detection voltage Emax4 and the threshold voltage Eh4 at the predetermined rate for detecting coincidence are almost the same compared with the characteristic 302 shown in FIG. 14, the inclination of the intermediate length part of the characteristic 306 is comparatively steep. This is a phenomenon which is generated because the light reception area increases with the square of the light reception length L and consequently the accuracy for obtaining the light reception length L which becomes the detection voltage at the predetermined intermediate rate is improved.

Figure 24:
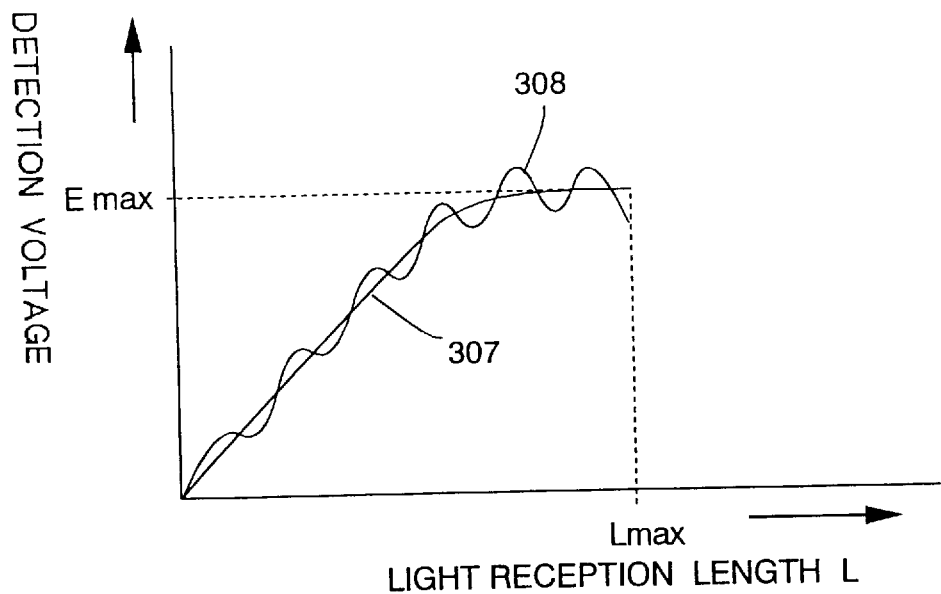
FIG. 24 is a drawing showing the dependency of the relationship between the light reception length L of a solar cell and the output voltage on the size of the solar cell.

FIG. 24 is a drawing showing the dependency of the relationship between the light reception length L of a solar cell and the detection voltage on the size (vertical length) of the solar cell. In the drawing, a numeral 307 indicates a characteristic which is obtained when the vertical length of the photo detector (solar cell) is sufficiently long enough against the interval between scanning lines and a numeral 308 indicates a characteristic which is obtained when the vertical length of the photo detector (solar cell) is not long enough against the interval between scanning lines. Since the projected pattern has a scanning line structure, the brightness in the vertical direction is not continuous. When the size of the photo detector is comparatively small, brightness changes are sampled by the photo detector, so that a swell is generated in the characteristic like the characteristic 308 and precise coincidence detection may not be possible. Therefore, it is desirable that the vertical length of the photo detector (solar cell) is long enough compared with the interval of scanning lines that the swell can be reduced within the tolerance.

Figure 25:
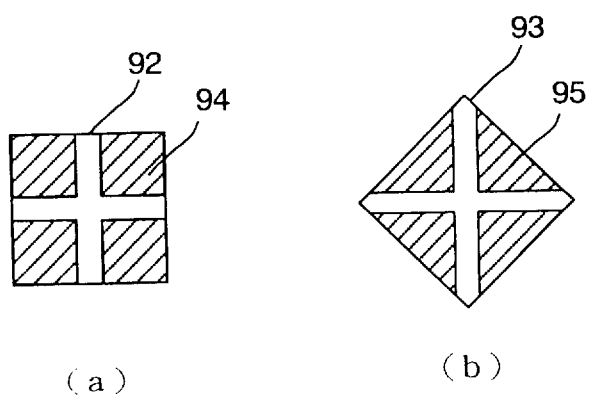
FIG. 25 is a drawing showing examples of a solar cell which are partly shielded from light.

FIG. 25 is a drawing showing an example of a solar cell which is shielded from light as a method for improving the inclination of the intermediate length part and improving the coincidence detection precision in the relationship between the light reception length L of the photo detector using the solar cell and the output voltage. (a) shows an example when a rectangular solar cell 92 is arranged so that the sides thereof are horizontal and vertical respectively and (b) shows an example when a diamond solar cell 93 is arranged so that the diagonal lines thereof are horizontal and vertical respectively. Numerals 94 and 95 indicate light-shielded parts. It is not desirable generally to produce a solar cell in a specific shape from the viewpoint of productivity. Therefore, light-shielded parts are provided in a square solar cell as shown in FIG. 25 so as to make the shape of light incident part of the photo detector crossed. By doing this, the change rate of the light reception area to a change in the light reception length in the intermediate length part increases extremely compared with that of other parts and the coincidence detection precision is improved.

Figure 26:
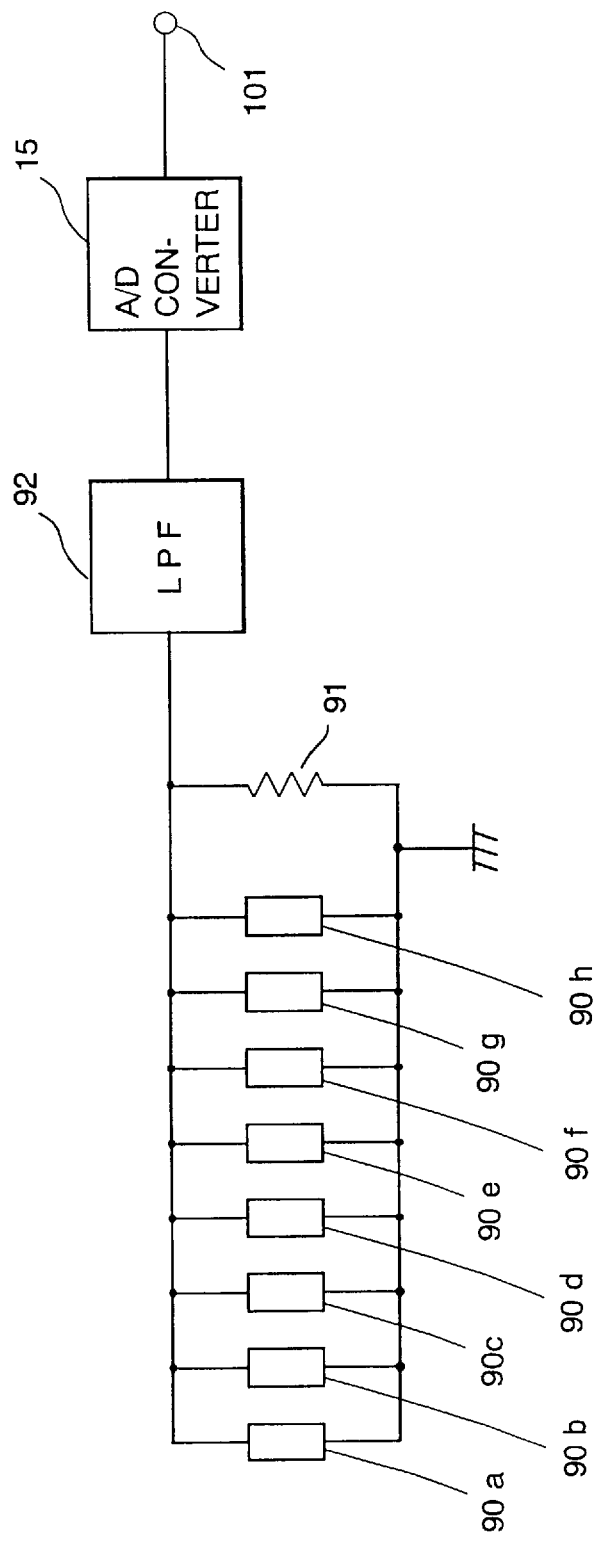
FIG. 26 is a circuit diagram showing a second constitution example of a photo detector.

FIG. 26 is a circuit diagram showing a second constitution example of a photo detector and particularly a circuit diagram showing an example of the connection method of a solar cell. Since there are many parts which are the same as those shown in FIG. 10, the explanation of the parts will be omitted and only different parts will be explained. When many photo detectors are used for adjustment as shown in FIG. 1 or 8, it is important to simplify the connection. In FIG. 26, as mentioned previously, each solar cell can be handled as a kind of current source, so that solar cells 90a to 90h are connected in parallel with each other and a load resistor 91 is shared among then. When an individual adjustment pattern is projected in the neighborhood of each solar cell so as to execute individual adjustment, adjustment in the neighborhood of each solar cell can be executed independently though they are connected in parallel with each other.

Figure 27:
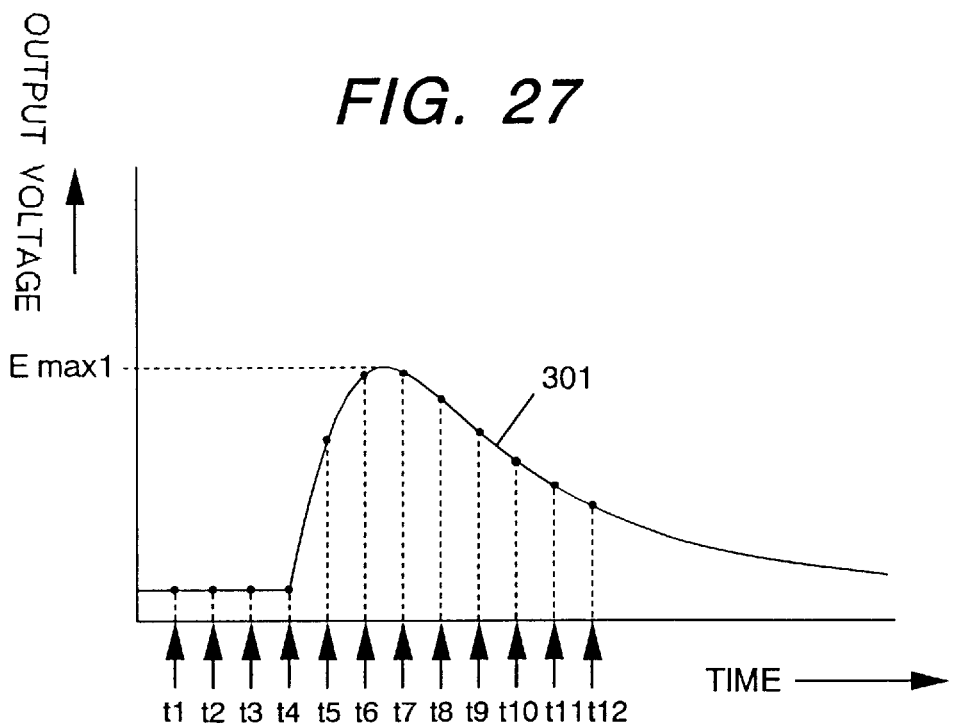
FIG. 27 is an illustration showing an example of a method for obtaining a stable maximum output voltage.

FIG. 27 is a drawing for explaining another example for avoiding the problem of normalization which comes into problem in FIGS. 18 and 19 and an illustration showing an example of a method for obtaining a stable maximum detection voltage. To obtain the maximum detection voltage Emax1 in the characteristic 301, measurement is not always made in the fixed timing but the output voltage photo detector is detected at each timing of t1 to t12, and a peak value is obtained by interpolation calculation based on these detection results, and the peak value is taken as the maximum detection voltage Emax1. Since the peak value is obtained, even when the timing of the output voltage wave form of photo detector is shifted like the output voltage wave form 305 shown in FIG. 19, the maximum detection voltage Emax1 is kept unchanged and stable coincidence detection is possible.

In the explanation of FIG. 27, the peak value of the output voltage of the photo detector is obtained. However, needless to say, when an added value, mean value, or integral value of the output voltage at each timing of t1 to t12 is obtained instead of it and the detection operation is performed on the assumption that the value is the maximum output voltage Emax1, more stable coincidence detection is possible.

Figure 28:
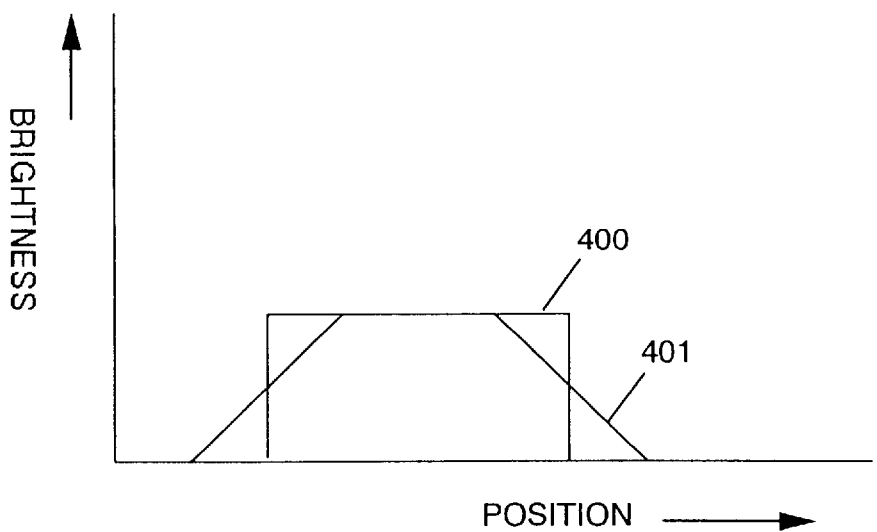
FIG. 28 is a drawing showing a brightness distribution of an adjustment window pattern.

FIG. 28 is a drawing showing a brightness distribution of an adjustment window pattern. A window pattern which changes stepwise as shown in a distribution 400 is generally used. It is considered as a best pattern because the edge part is detected. On the other hand, a pattern in which the brightness at the edge part changes slowly as shown in a distribution 401 may be used. When the photo detector is installed at a fixed distance from the screen surface toward the projection tube due to a restriction of the structure, the focusing there is not perfect and even when a window pattern is electrically like the distribution 400, a brightness distribution having a gently-sloping edge as the distribution 401 is obtained consequently. In either way, when the coincidence detection sensitivity is sufficient, there is no problem imposed.

Figure 29:
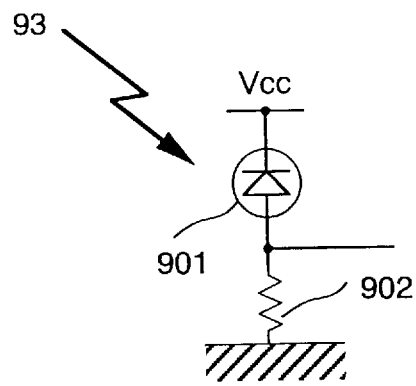
FIGS. 29 to 31 are circuit diagrams of embodiments using different photo detector.
Figure 30:
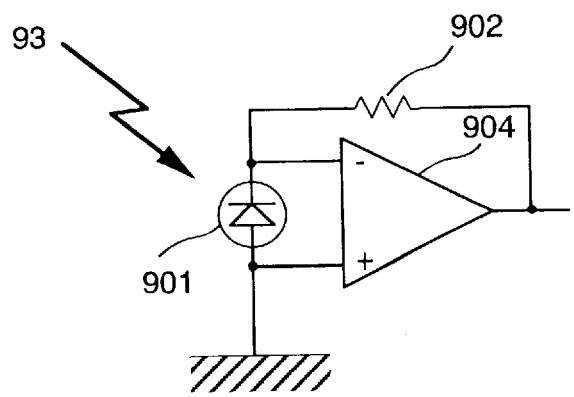
Figure 31:
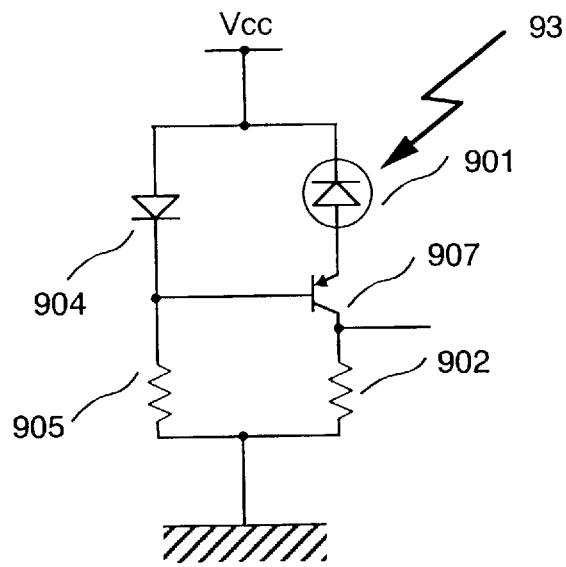

FIGS. 29 to 31 are drawings showing other embodiments of the photoelectric converter 900 respectively. Although the solar cell shown in FIG. 10 is used partially as a photoelectric device of voltage output type, the photoelectric device shown in FIGS. 29, 30, and 31 is used as a pure photoelectric device of current output type.

In FIG. 29, a numeral 901 indicates a photoelectric device of current output such as a solar cell, a photodiode, or a phototransistor which is used as a current output device. A numeral 902 indicates a load resistor and a symbol Vcc indicates a voltage source. When light 93 comes in the photoelectric device 901, the photoelectric device 901 generates a photo current according to the quantity of light and the photo current is converted to a voltage by the load resistor 902. FIG. 29 shows a most simple constitution example.

FIG. 30 shows a constitution example using an operation amplifier. In the drawing, a numeral 904 indicates an operation amplifier and the other numerals are the same as those shown in FIG. 29. A current generated by the photoelectric device 901 is converted to a voltage by the load resistor 902 in the same way as that shown in FIG. 29. However, since the operation amplifier 904 is used, the constitution is characterized in that the output impedance is low and no bias voltage is applied to between the both ends of the photoelectric device 901. Particularly when a solar cell is used as a photoelectric device, a bias voltage cannot be applied because of a problem of the characteristics such as a leak current. Therefore, the use of the circuit constitution shown in FIG. 30 is extremely effective.

FIG. 31 shows a constitution example of a type that no bias voltage is applied to the photoelectric device in the same way as with FIG. 30. In the drawing, a numeral 904 indicates a diode, 905 a bias resistor, and 907 a transistor and the other numerals are the same as those shown in FIG. 29. FIG. 31 shows a circuit example using a transistor and it is structured so that the diode 904 and the resistor 905 determine the base voltage of the transistor 907 and no bias voltage is applied to the photoelectric device 901. When the light 93 comes in the photoelectric device 901, the photo current flows in the emitter of the transistor 907 and the greater part of the emitter current thereof is converted to a voltage by the load resistor 902. The circuit shown in FIG. 31 is characterized in that it has a simple constitution and is inexpensive and the dynamic range is large for a single power unit.

In FIGS. 29, 30, and 31, photoelectric devices 901 are installed at a plurality of parts in the overscanned area as shown in FIG. 1 or 8. Since it is expected that the quantity of incident light varies with each position, it is desirable to change the value of the load resistor 902 of each photoelectric device 900 so that the input signal of each A/D converter is on the most suitable level and highly precise photo detection can be executed.

Figure 32:
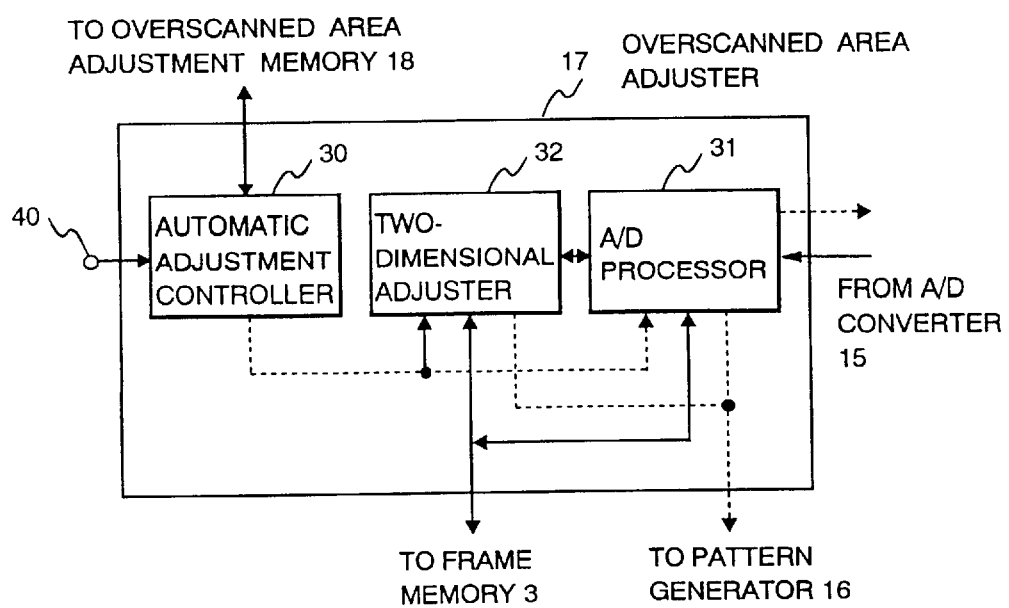
FIG. 32 is a block diagram of an overscanned area adjuster using the first adjustment method.

Next, the overscanned area adjuster 17 shown in FIGS. 1 and 8 will be explained in detail. FIG. 32 is a block diagram of the overscanned area adjuster 17 using the first adjustment method. In the drawing, a numeral 30 indicates an automatic adjustment controller for controlling the entire overscanned area adjuster 17, 31 an A/D processor for controlling the A/D converter 15, and 32 a two-dimensional adjuster for adjusting the horizontal position and the vertical position at the same time.

Figure 33:
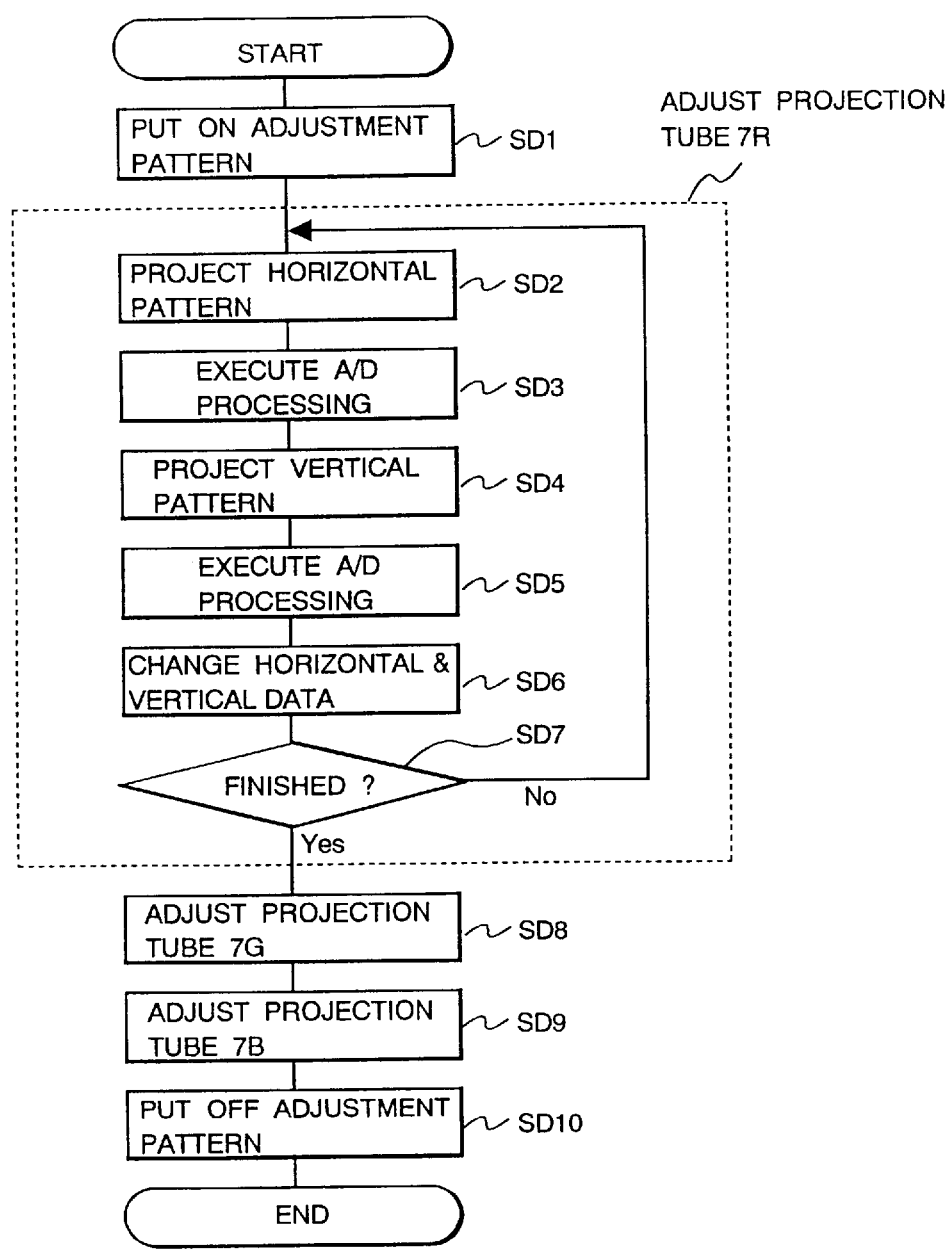
FIG. 33 is a control flow chart of the first adjustment method.

When automatic adjustment is executed, an adjustment start instruction is inputted to the automatic adjustment controller 30 from an input terminal 40. Thereafter, the system and the color projection TV set are controlled overall by the automatic adjustment controller 30. FIG. 33 is a control flow chart of the first adjustment method.

In FIG. 33, firstly at Step SD1, a pattern generated by the pattern generator 16 is projected. At Steps from SD2 to SD7, the projection tube 7R is automatically adjusted. At Step SD2, a horizontal pattern for adjusting the horizontal position is projected in the neighborhood of the photoelectric device of each photo detector. At Step SD3, the outputs of the photo detectors 13a to 13h are converted from analog to digital respectively through the A/D processor 31. At Step SD4, a vertical pattern for adjusting the vertical position is projected in the neighborhood of the photoelectric device of each of the photo detectors 13a to 13h. At Step SD5, the outputs of the photo detectors 13a to 13h are converted from analog to digital respectively through the A/D processor 31. At Step SD6, the adjustment direction is discriminated on the basis of the values converted at Steps SD3 and SD5, and the horizontal and vertical correction data are adjusted at the same time, and the corrected data are memorized in the memory 3. The determination of the adjustment direction will be described in detail later. Next, at Step SD7, whether the adjustment of all the photo detectors is ended or not is discriminated. When the adjustment is not ended, the processing is returned to Step SD2 and the adjustment is iterated. When the adjustment is ended, the processing goes to Step SD8. At Step SD8, the automatic adjustment for the projection tube 7G is executed in the same way as with the projection tube 7R for which the adjustment is executed at Steps from SD2 to SD7. Also at Step SD9, the automatic adjustment is executed for the projection tube 7B. At Step SD10, projection of an adjustment pattern by the patter generator 16 is stopped, and a video signal is projected, and the automatic adjustment ends.

Figure 34:
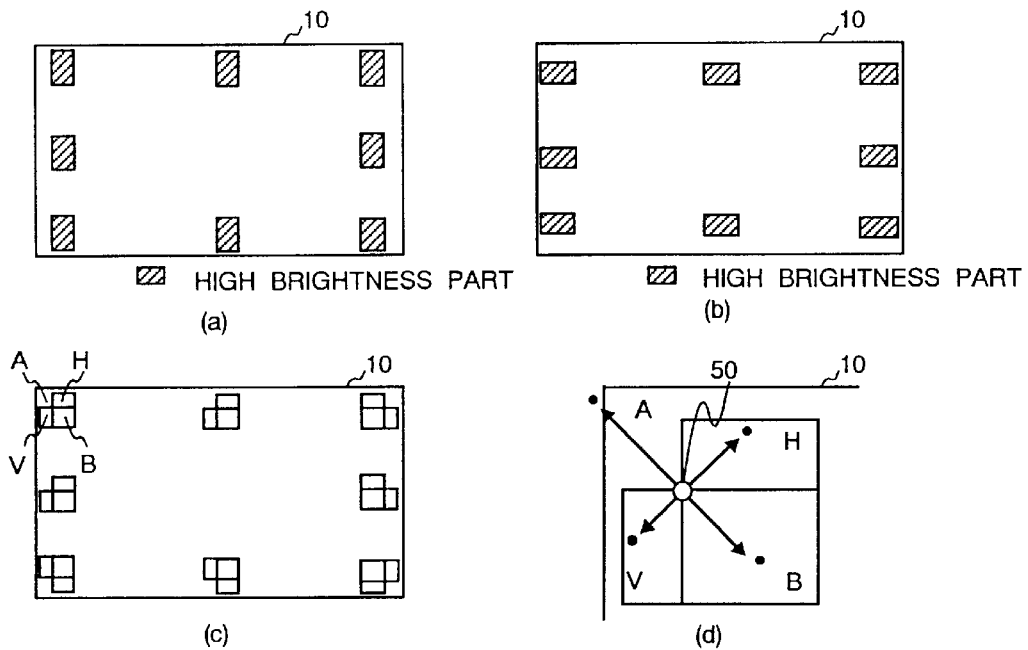
FIG. 34 is a drawing showing an example of an adjustment pattern generated by the pattern generator.

Next, the adjustment direction discriminated at Step SD6 in the flow chart shown in FIG. 33 will be described. FIG. 34 is a drawing showing an example of an adjustment pattern generated by the pattern generator 16 for automatic adjustment. FIG. 34(a) shows a horizontal pattern for adjusting the horizontal position, and FIG. 34(b) shows a vertical pattern for adjusting the vertical position, and FIG. 34(c) shows the relationship between the pattern shown in FIG. 34(a) and the pattern shown in FIG. 34(b), and FIG. 34(d) is a drawing of the area corresponding to the position on the upper left of the screen shown in FIG. 34(c) which is taken out. A numeral 50 indicates an intersection point of the edges of the horizontal and vertical patterns. As shown in FIG. 34, when the horizontal position is adjusted, a vertically long pattern is projected and when the vertical position is adjusted, a horizontally long pattern is projected. By doing this, as shown in FIG. 34(c), four areas such as an area H for projecting only a horizontal pattern, an area V for projecting only a pattern for detecting the vertical position, an area B for projecting both patterns for detecting the horizontal and vertical positions, and an area A for projecting neither of the patterns are formed in the scanning area. Therefore, the photo detector on the upper left of the screen is detected in one of the areas A, B, H, and V in FIG. 34(d). As a result, when it is detected in the area A, the horizontal correction data and the vertical correction data are changed so that the position of the intersection point 50 approaches the detection position of the photo detector and the adjustment pattern is moved to the upper left of the screen. When the photo detector is detected in the area B, the adjustment pattern is moved to the lower right of the screen, and when the photo detector is detected in the area H, the adjustment pattern is moved to the upper right of the screen, and when the photo detector is detected in the area V, the adjustment pattern is moved to the lower left of the screen.

Figure 35:
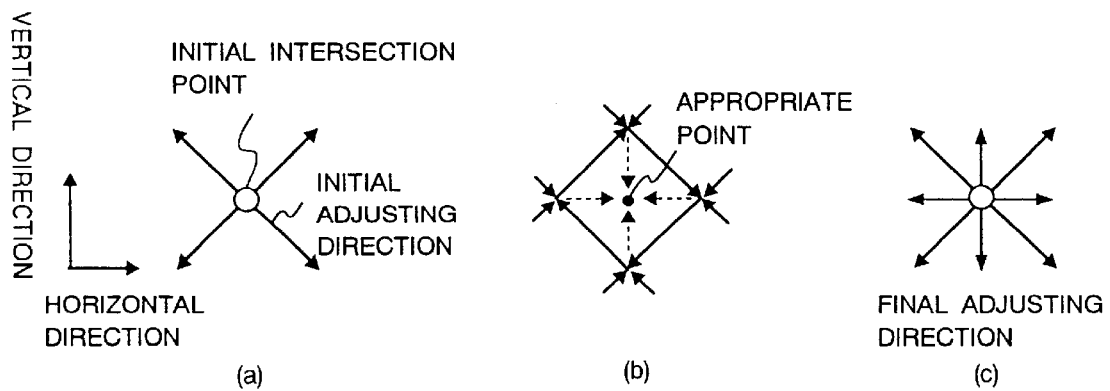
FIG. 35 is a drawing showing the adjustment direction by the two-dimensional adjuster.

Next, the adjustment direction for convergence will be described by referring to FIG. 35. FIG. 35 is a drawing showing the adjustment direction by the two-dimensional adjuster 32.

FIG. 35(a) shows the adjustment direction in the initial adjustment state, and FIG. 35(b) shows the process of the convergence adjustment, and FIG. 35(c) shows the adjustment direction in the almost final adjustment state. In the initial adjustment state, by the change of the horizontal and vertical correction data at the same time, adjustment is executed at the position on the screen as shown in FIG. 35(a). However, in the almost final adjustment state as shown in FIG. 35(b), only by adjustment of changing the horizontal and vertical correction data at the same time, the intersection point cannot approach to the appropriate point. Therefore, it is discriminated from the area detected in the past and the present area that settlement will be obtained soon, and switching from an adjustment method for changing the horizontal and vertical correction data at the same time to an adjustment method for changing only the horizontal or vertical correction data is executed on the basis of the above mentioned information, and as a result, an operation for adjusting to the settlement point is performed.

Figure 36:
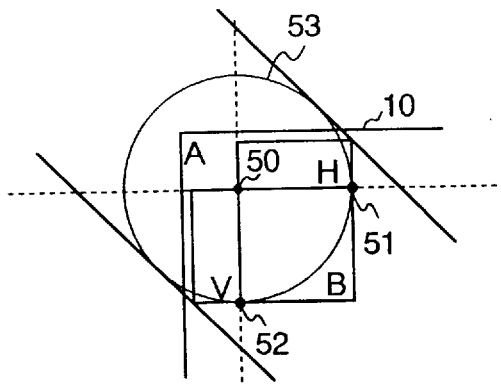
FIG. 36 is a schematic diagram showing the relationship between a horizontal pattern ana a vertical pattern projected around the photoelectric device.

Next, the pattern size shown in FIG. 34 will be explained by referring to FIG. 36. FIG. 36 is a schematic diagram showing the relationship between a horizontal pattern and a vertical pattern which are projected in the neighborhood of the photoelectric device of a photo detector. A numeral 50 indicates an intersection point when the local area is divided into four areas by two horizontal and vertical patterns, 51 a point for explaining the lateral width of the horizontal pattern, 52 a point for explaining the longitudinal width of the vertical pattern, and 53 a dislocation area where the dislocation between the photoelectric device of the photo detector and the intersection point 50 is shorter than DL. When the relationship is as shown in FIG. 36, the position of the photoelectric device of the photo detector is always in a circle with a radius of DL round the intersection point 50, that is, in the area 53. Therefore, when adjustment in the area 53 is possible, it will be surely settled. When the aforementioned first adjustment method is used, adjustment is executed so that the pattern position is changed obliquely. Therefore, when the distances between the intersection points 50 and the point 51 and the distance between the intersection points 50 and the point 52 are set to more than DL, the pattern can be surely detected and adjustment can be executed with stability.

As explained above, when the first adjustment method is used, by setting the width of the adjustment pattern to larger than the dislocation of the photoelectric device of the photo detector, the adjustment pattern can be detected surely. Since four areas are provided according to whether the horizontal and vertical pattern are detected or not, the detection area can be grasped surely during adjustment. Furthermore, since the adjustment area can be grasped, adjustment of changing the both of horizontal and vertical correction data at the same time can be executed. Therefore, even when photo detectors are arranged in the overscanned area, the adjustment area is grasped and the horizontal and vertical correction data are adjusted at the same time, so that the adjustment can be executed in a short time and settled stably. In addition, if adjustment patterns are detected in the order of the horizontal and vertical patterns or in the order of the vertical and horizontal patterns, then they should be detected in the contrary order to shorter the switching time of the adjustment patterns.

Figure 37:
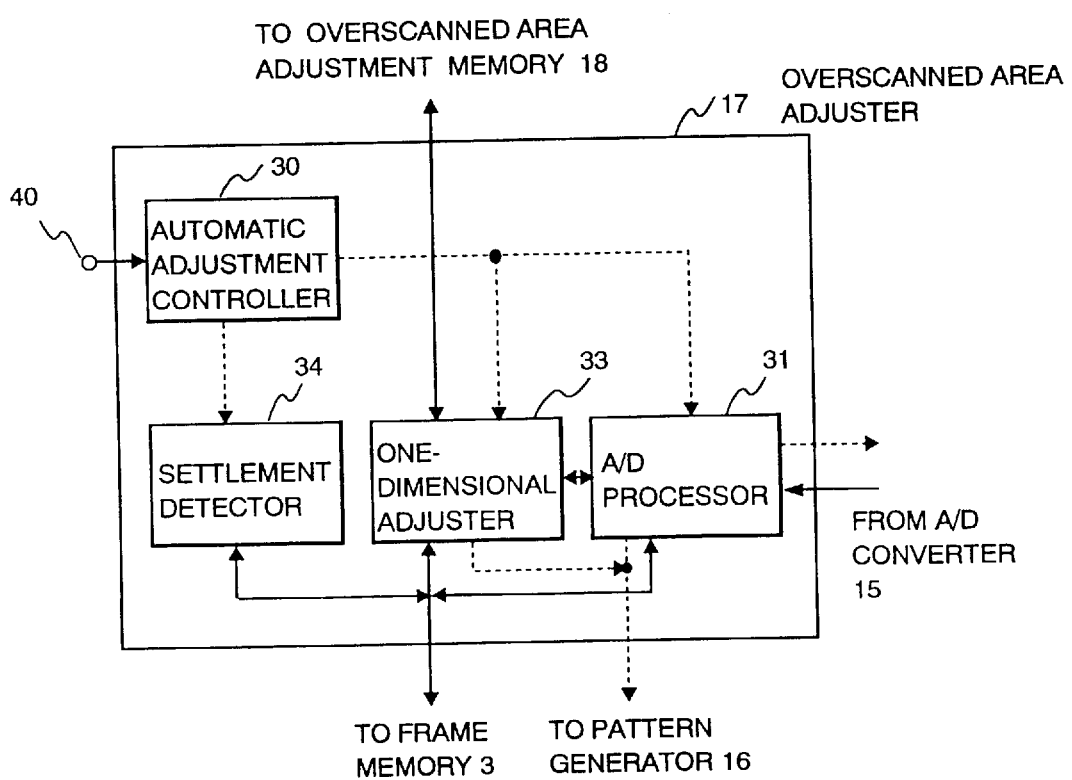
FIG. 37 is a block diagram of adjustment of the photo detecting device position using the second adjustment method.

Next, the second adjustment method will be explained. FIG. 37 is a block diagram of the overscanned area adjuster 17 using the second adjustment method.

Figure 38:
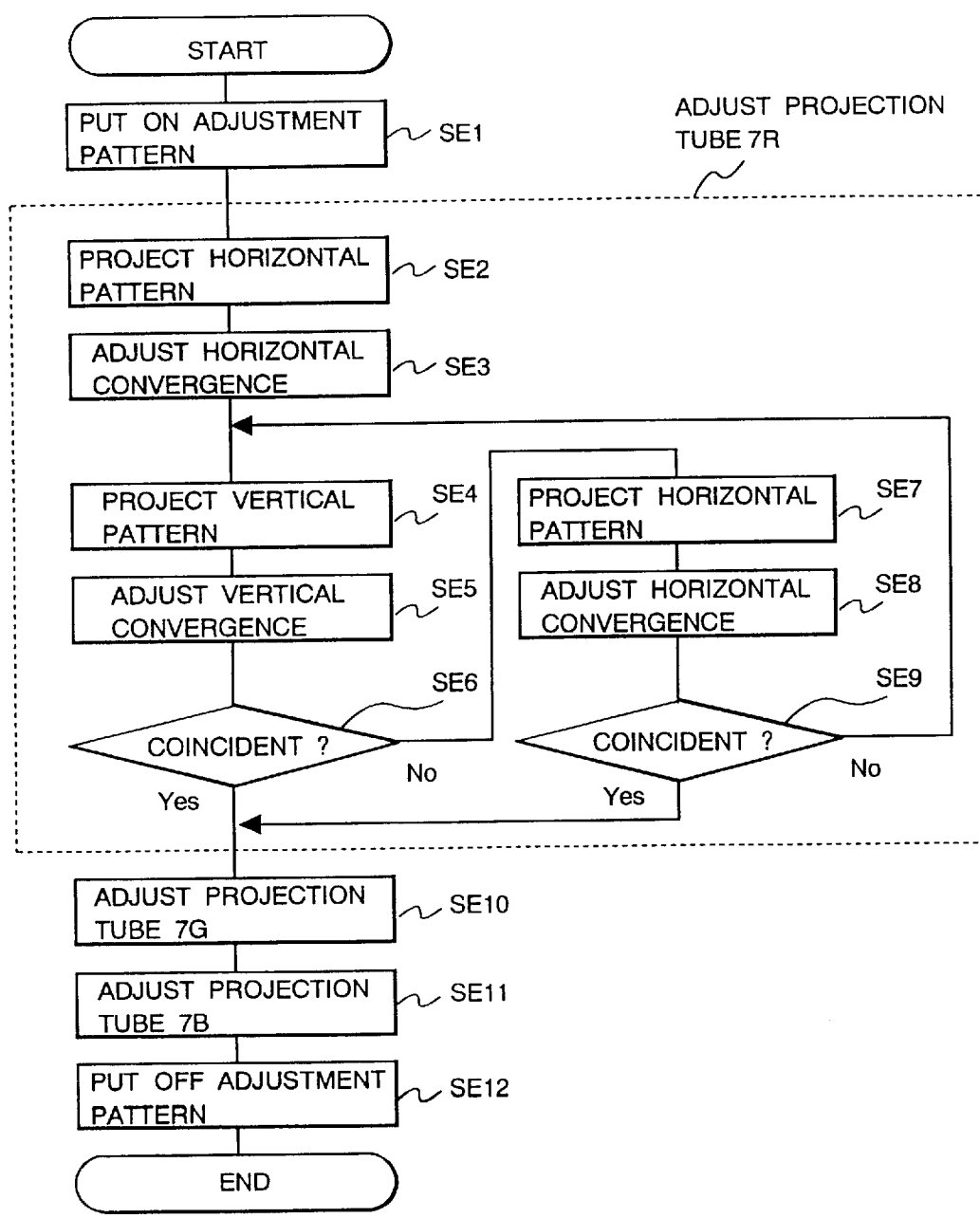
FIG. 38 is a control flow chart of the second adjustment method.

In FIG. 37, a numeral 33 indicates a one-dimensional adjuster and 34 a convergence detector. The same numeral is assigned to each part which performs the same operation as that of the constitution shown in FIG. 32 and the explanation thereof will be omitted. FIG. 38 is a control flow chart by the second adjustment method.

In FIG. 38, firstly at Step SE1, a pattern generated by the pattern generator 16 is controlled so as to project it in the overscanned area in the neighborhood of the photoelectric device. Next at Steps from SE2 to SE9, the projection tube 7R is automatically adjusted. At Step SE2, the horizontal pattern shown in FIG. 34(a) is projected in the neighborhood of the photoelectric device. At Step SE3, the outputs of the photo detectors 13a to 13h are converted to digital values sequentially through the A/D processor 31 and the horizontal position is adjusted to coincide with the photoelectric device by rewriting the horizontal correction data by the one-dimensional adjuster 33. At Step SE4, the vertical pattern shown in FIG. 34(b) is projected in the neighborhood of the photo detector. At Step SE5, the outputs of the photo detectors 13a to 13h are converted to digital values sequentially through the A/D processor 31 and the vertical position is adjusted to coincide with the photoelectric device by the one-dimensional adjuster 33. At Step SE6, the settlement detector 34 detects a variation in the vertical correction data between before and after adjustment at Step SE5 and discriminates settlement of the vertical position. When the variation of the data satisfies the condition of 0 or less than the adjustment tolerance, the convergence detector 34 discriminates that the adjustment of the projection tube 7R ends. When the variation does not satisfy the condition, the horizontal position is adjusted again at Steps SE7 and SE8. At Step SE9, the settlement detector 34 detects a variation in the horizontal correction data between before and after adjustment SE8 and discriminates settlement of the horizontal position. When the variation of the data satisfies the condition of 0 or less than the adjustment tolerance in the same way as at Step SE6, the settlement detector 34 discriminates that the adjustment of the projection tube 7R ends. When the variation does not satisfy the condition, the processing is returned to Step SE4 and the adjustment of the vertical position is executed again and iterated until the correction data of the projection tube 7R is settled. When the adjustment of the projection tube 7R ends, the projection tubes 7G and 7B are adjusted at Steps SE10 and SE11 in the same way as with the projection tube 7R. At Step SE12, the projection of adjustment patterns generated by the pattern generator 16 is stopped, and a video signal is projected, and the automatic adjustment ends.

Figure 39:
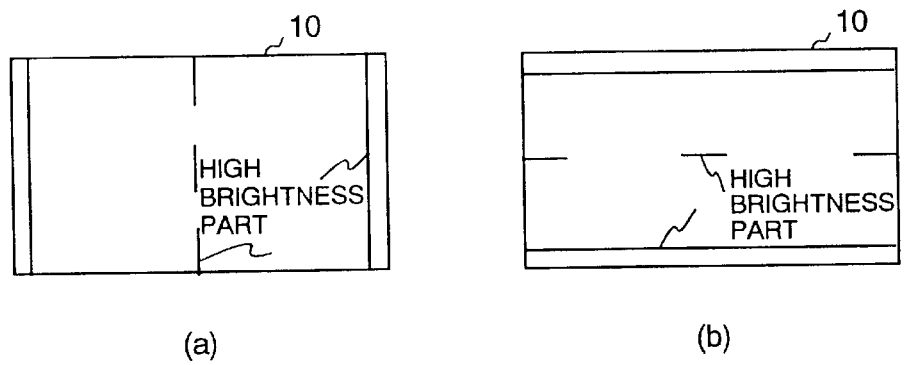
FIG. 39 is a drawing showing an example of a pattern displayed in the second adjustment method.

As to a display example of a pattern to be projected during adjustment by the second adjustment method, adjustment by the patterns shown in FIG. 39 is possible instead of the patterns shown in FIG. 34. FIG. 39(a) shows a pattern for detecting and adjusting the horizontal position and FIG. 39(b) shows a pattern for detecting and adjusting the vertical position. The horizontal and vertical positions are adjusted so that the brightness line coincides with the photoelectric device in the overscanned area, therefore it is desirable that the patterns are projected in the neighborhood of the photo detector.

In the second adjustment method, the horizontal (vertical) position is adjusted and settled and then the vertical (horizontal) position is adjusted and settled. Thereafter, the correction data before and after the vertical (horizontal) position is adjusted are compared. When a variation of the data is little and close to 0, it can be considered that the vertical (horizontal) position is settled. In this case, the horizontal (vertical) position was settled once at the stage before the vertical (horizontal) position is adjusted. Therefore, the horizontal position and the vertical position can be settled at the same time and even when the horizontal and vertical positions interfere with each other especially in the overscanned area, the adjustment can be settled surely.

Figure 40:
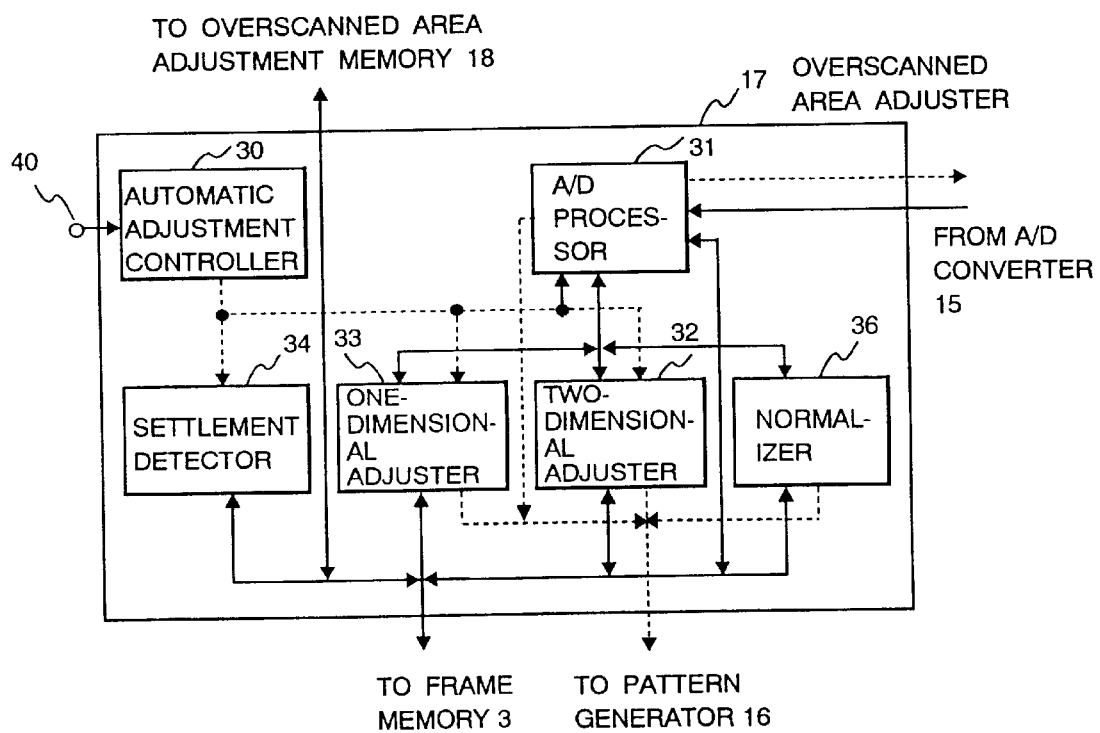
FIG. 40 is a block diagram of an overscanned area adjuster using the first and second adjustment methods.
Figure 41:
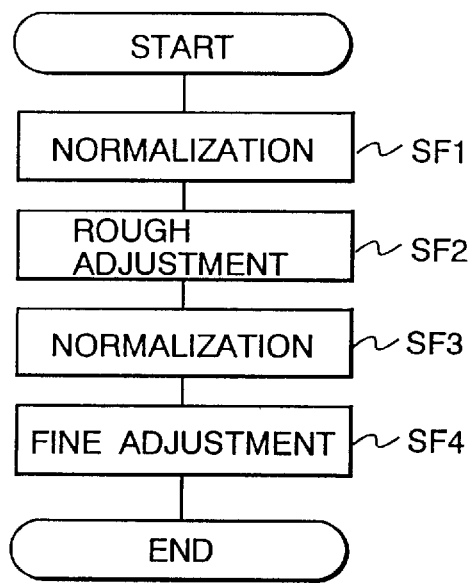
FIG. 41 is a control flow chart for automatic adjustment when the first and second adjustment methods are used.

Next, a method for using both of the first adjustment method and the second adjustment method for adjustment will be explained. FIG. 40 is a block diagram of an overscanned area adjuting using the first and second adjustment methods. In FIG. 40, a numeral 36 indicates a normalizer. The same numeral is assigned to each part which performs the same operation as that of the constitutions shown in FIGS. 32 and 37 and the explanation thereof will be omitted. FIG. 41 is a control flow chart for automatic adjustment in the constitution shown in FIG. 40.

Figure 42:
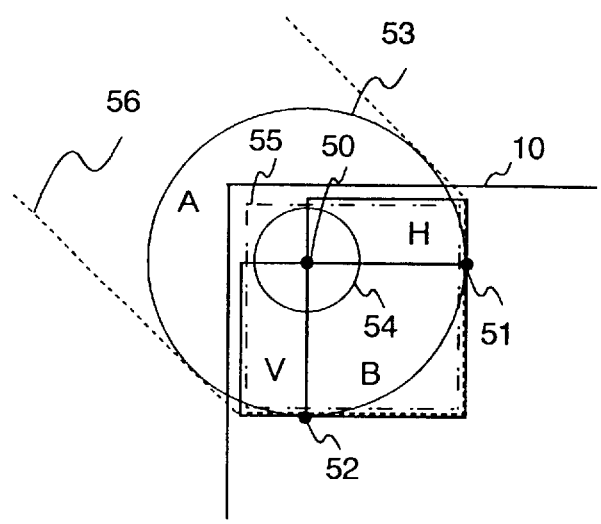
FIG. 42 is a drawing showing adjustment areas to be adjusted by rough adjustment and fine adjustment.

In FIG. 41, the rough adjustment at Step SF2 is adjustment by the first adjustment method and the fine adjustment at Step SF4 is adjustment by the second adjustment method and the contents thereof are the same as the control flow charts shown in FIGS. 33 and 38 respectively. The normalization at Steps SF1 and SF3 executes processing for grasping the status of degradation of the photoelectric device 13 of the photo detector, effects of external light, brightness degradation of the projection tube 7, etc. The processing method for normalization will be described later in detail. FIG. 42 is a drawing showing adjustment areas to be adjusted by rough adjustment and fine adjustment and shows the pattern on the upper left of the screen in the same way as with FIG. 36.

In FIG. 42, a numeral 53 indicates a maximum area of dislocation of the photoelectric device from the intersection point 50, 54 an area to be adjusted in by rough adjustment, 55 an area which can be adjusted by fine adjustment, and 56 an area which can be adjusted by rough adjustment. The same numeral or symbol is assigned to each part which is the same as that shown in FIG. 36. The fine adjustment is used to adjust the horizontal position and vertical position independently, so that the range which can be adjusted by the fine adjustment is limited to the area 55. Therefore, when the scanning area 10 and the intersection point 50 are related to each other as shown in the drawing in relation to the area 53 of the maximum dislocation of the photoelectric device, an area which cannot be adjusted only by the fine adjustment exists. Therefore, the area 53 is adjusted to the area 54 in the area 55 first by the rough adjustment. Since the rough adjustment can adjust obliquely, the adjustable area is the area 56 and the area 53 of the maximum dislocation can be adjusted. Next, the area 54 is settled to the intersection point 50 finally by the fine adjustment. When these operations are performed for all the photo detectors and all the projection tubes, the adjustment is completed.

As explained above, in the first adjustment method, when the horizontal and vertical patterns are projected, and the adjustment area is grasped, and the two horizontal and vertical correction data are changed at the same time, even if the horizontal and vertical positions interfere with each other greatly in the overscanned area, they can be adjusted in the settlement direction in a short time with stability. In the second adjustment method, the horizontal position and the vertical position are adjusted alternately and the horizontal position and the vertical position can be surely settled finally so as to discriminate settlement by comparing data before and after adjustment.

Figure 43:
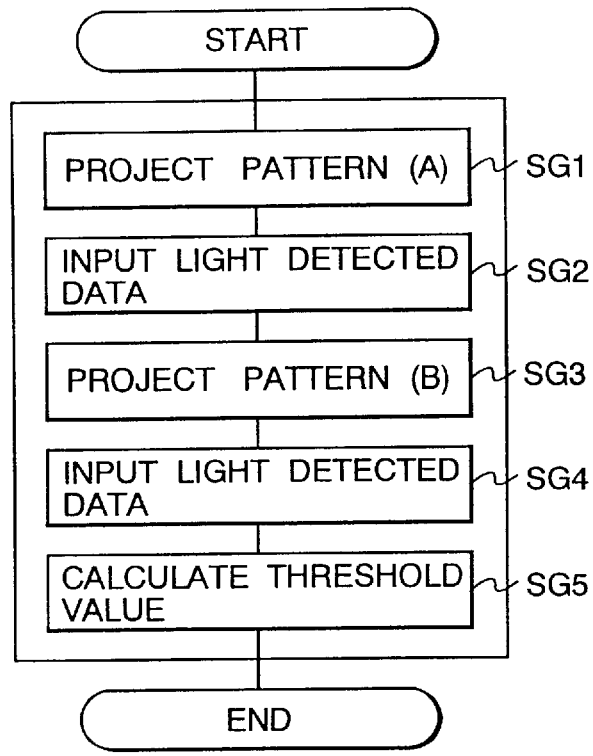
FIG. 43 is a control flow chart of normalization by the normalizer.
Figure 44:
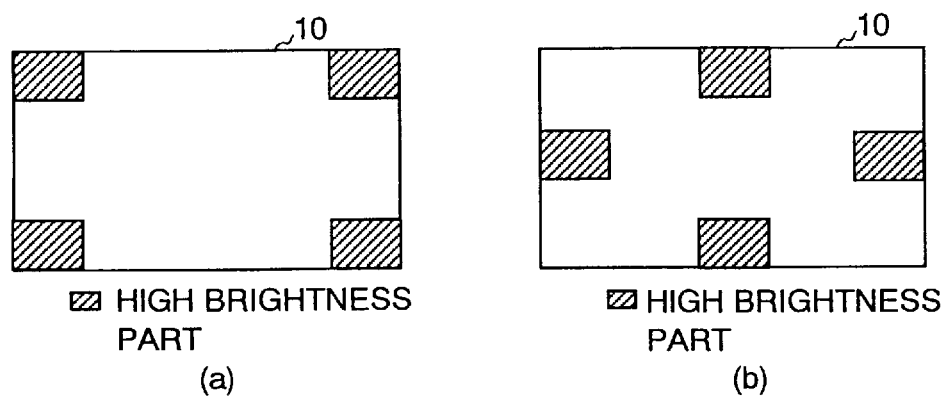
FIG. 44 is a drawing showing a display example of a pattern projected during normalization.

Next, the normalization processing shown in the flow chart in FIG. 41 will be explained. FIG. 43 is a control flow chart of normalization by the normalizer 36. FIG. 44 is a drawing showing a display example of a pattern projected during normalization. The relationship between FIGS. 44(a) and 44(b) is set to patterns that the position of the photo detector corresponding to the high brightness part in FIG. 44(a) is the low brightness part in FIG. 44(b) and the position of the photo detector corresponding to the low brightness part in FIG. 44(a) is the high brightness part in FIG. 44(b). Firstly at Step SG1, the pattern shown in FIG. 44(a) is projected. At Step SG2, the output signal of each photo detector at this time is detected and memorized. Next at Step SG3, the pattern shown in FIG. 44(b) is projected. At Step SG4, the output signal of each photo detector at this time is detected and memorized. At Step SG5, the predetermined rate is calculated on the basis of the memorized data which is obtained when the patterns shown in FIGS. 44(a) and 44(b) are projected and the rate is memorized temporarily. The series of operations is performed for each projection tube and for adjustment, whether there is a pattern or not is discriminated on the basis of the temporarily memorized data and adjustment is executed.

Figure 45:
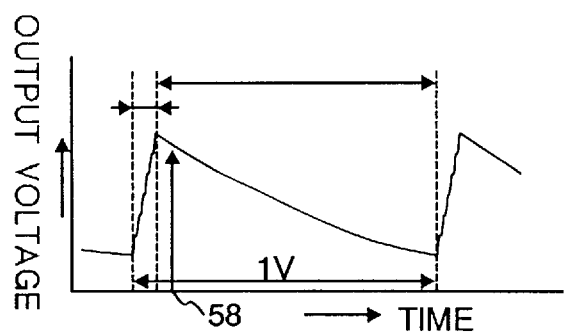
FIG. 45 is a schematic diagram of the wave form of a detected signal of a photoelectric device 13.
Figure 46:
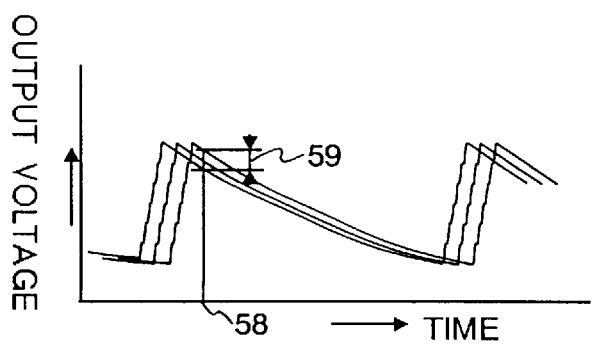
FIG. 46 is a schematic diagram of the wave form of a detected signal of a photoelectric device 13 when the correction data is changed.

Next, the reason for executing the second normalization will be described. FIG. 45 is a schematic diagram of the output voltage of the photo detector 13. When the brightness part of a pattern is projected in the photoelectric device, a wave form of a vertical cycle is obtained as shown in the drawing. The period that the wave form rises steeply is the period that the pattern is projected on the photoelectric device. The period of smoothly lowering is caused by the phosphor of the projection tube and the transient characteristic of the internal circuit of the photo detector. As shown in the drawing, the wave form is extremely steep in the rising period, so that the timing for A/D conversion is set at the timing 58 where the voltage is slightly lower than the peak value and smoothly lowering. As a result, large changes during A/D conversion are decreased. FIG. 46 is a schematic diagram of the output voltage of the photo detector 13 in a case when the correction data is changed. When the correction data is changed, the scanning position detected by the photoelectric device is changed, so that the phase of the detected wave form is changed as shown in the drawing. As a result, as the correction data is changed by adjustment, the detection level at the timing 58 is changed. Therefore, at the stage that the rough adjustment is executed and the dislocation range is controlled within the predetermined area (the area 54 shown in FIG. 42), the second normalization is executed. When the area 54 is sufficiently small, changes in the scanning position during fine adjustment can be ignored, so that the aforementioned problem that the detection level is changed can be avoided. Also at the halfway stage of fine adjustment, the adjustment precision can be improved by executing normalization a plurality of times. Even when a peak hold circuit is installed on the preceding stage of the A/D converter 15 or the A/D processor 31 performs the same operation as peak hold, by executing normalization during adjustment, the effect of external light which changes momentarily can be reduced. Therefore, needless to say, the adjustment precision is improved. In this embodiment, normalization when both of the first and second adjustment methods are used is described. However, the present invention can be applied also to a case that either of the first adjustment method and the second adjustment method are used independently.

Next, the A/D processing will be described.

Figure 47:
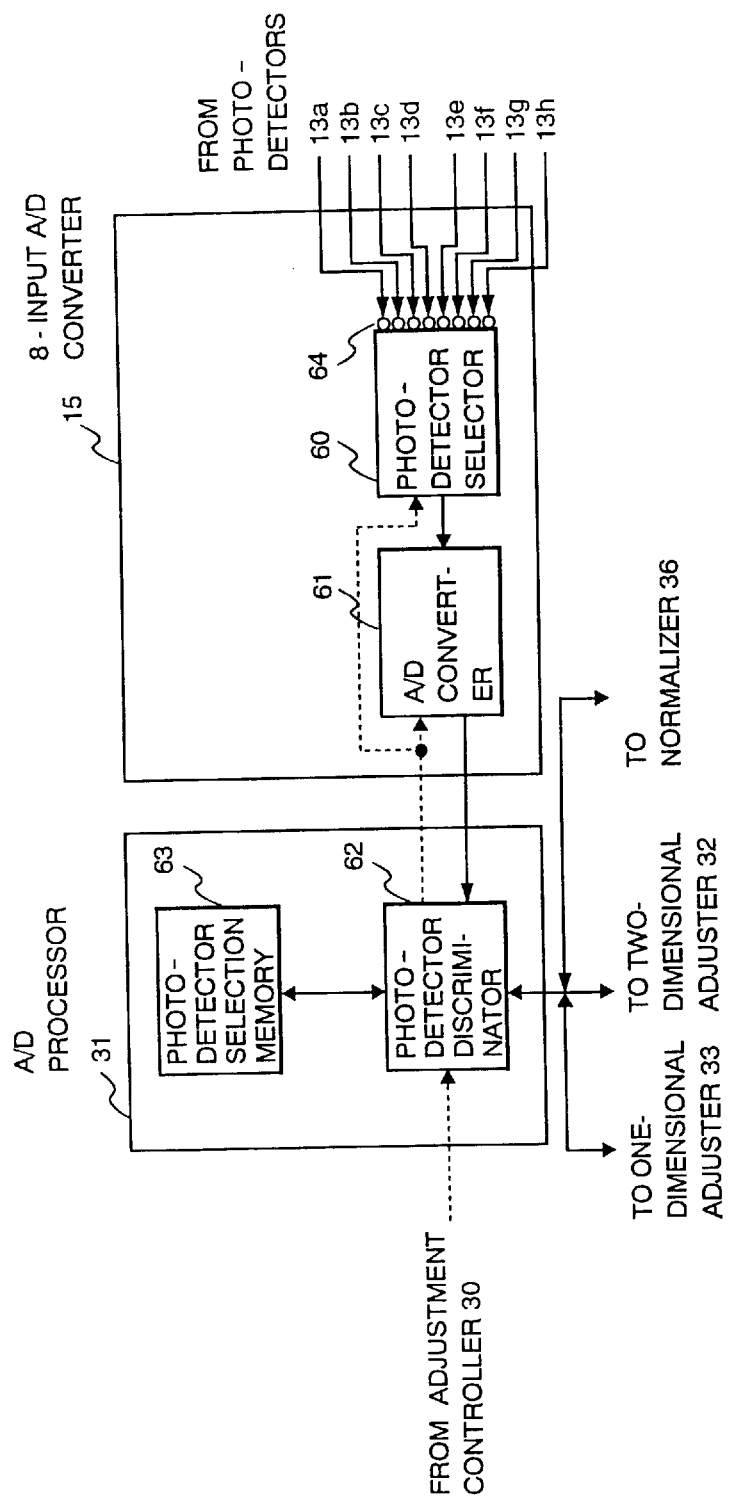
FIG. 47 is a block diagram of a means relating to A/D conversion.

FIG. 47 is a drawing showing an example of the inner constitution of the A/D processor 31 and the A/D converter 15. A numeral 60 indicates a photo detector selector for selecting one of the photo detectors 13a to 13h, 61 an analog/digital converter (A/D converter) for converting the output of the selected photo detector to a digital value, 62 a photo detector discriminator, 63 a photo detector selection memory, and 64 input terminals of the photo detector selector. A nonvolatile memory (EEPROM) which can be rewritten electrically is used as a photo detector selection memory 63.

Figure 48:
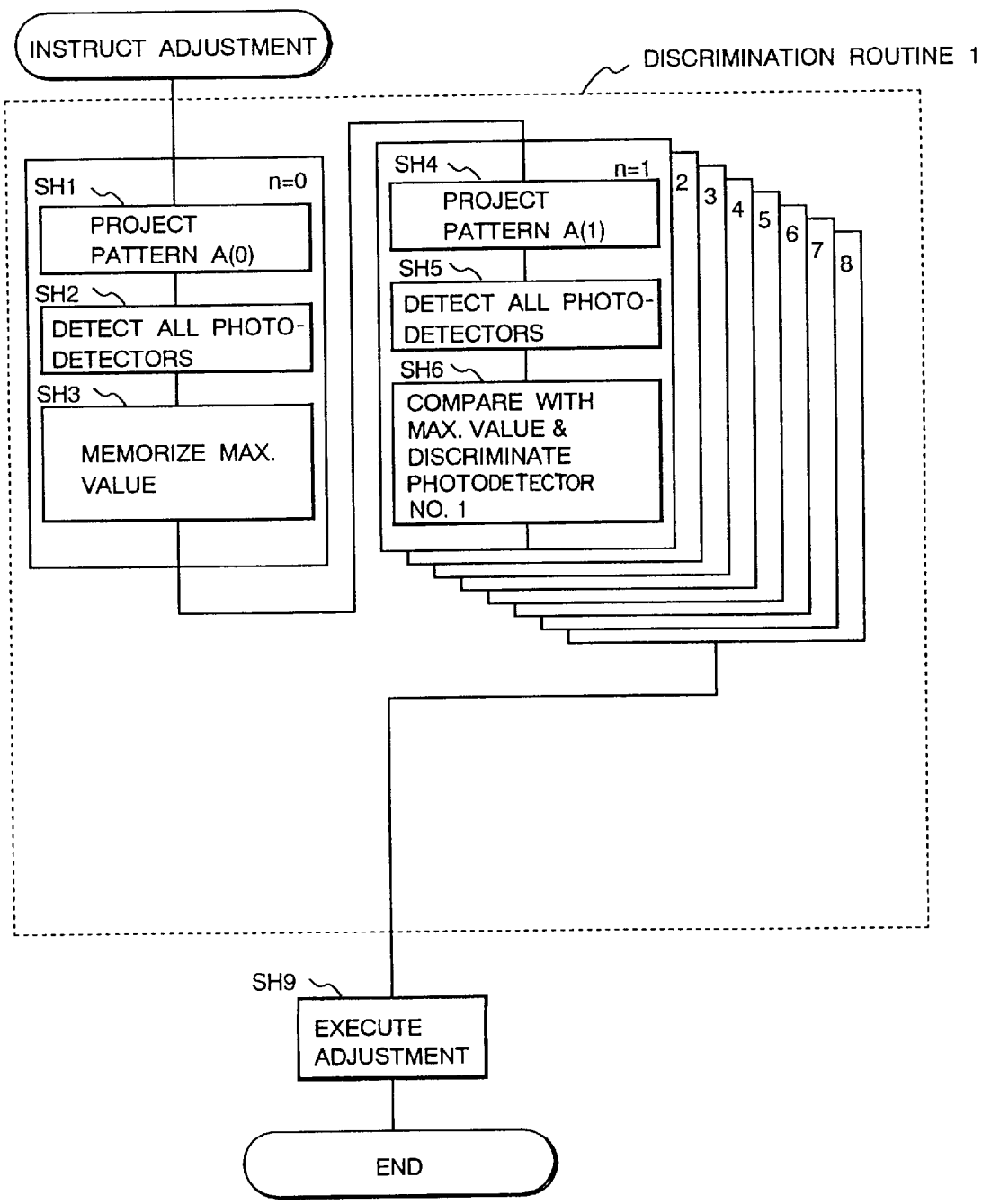
FIG. 48 is a flow chart showing the first operation of a photo detector discriminator.
Figure 49:
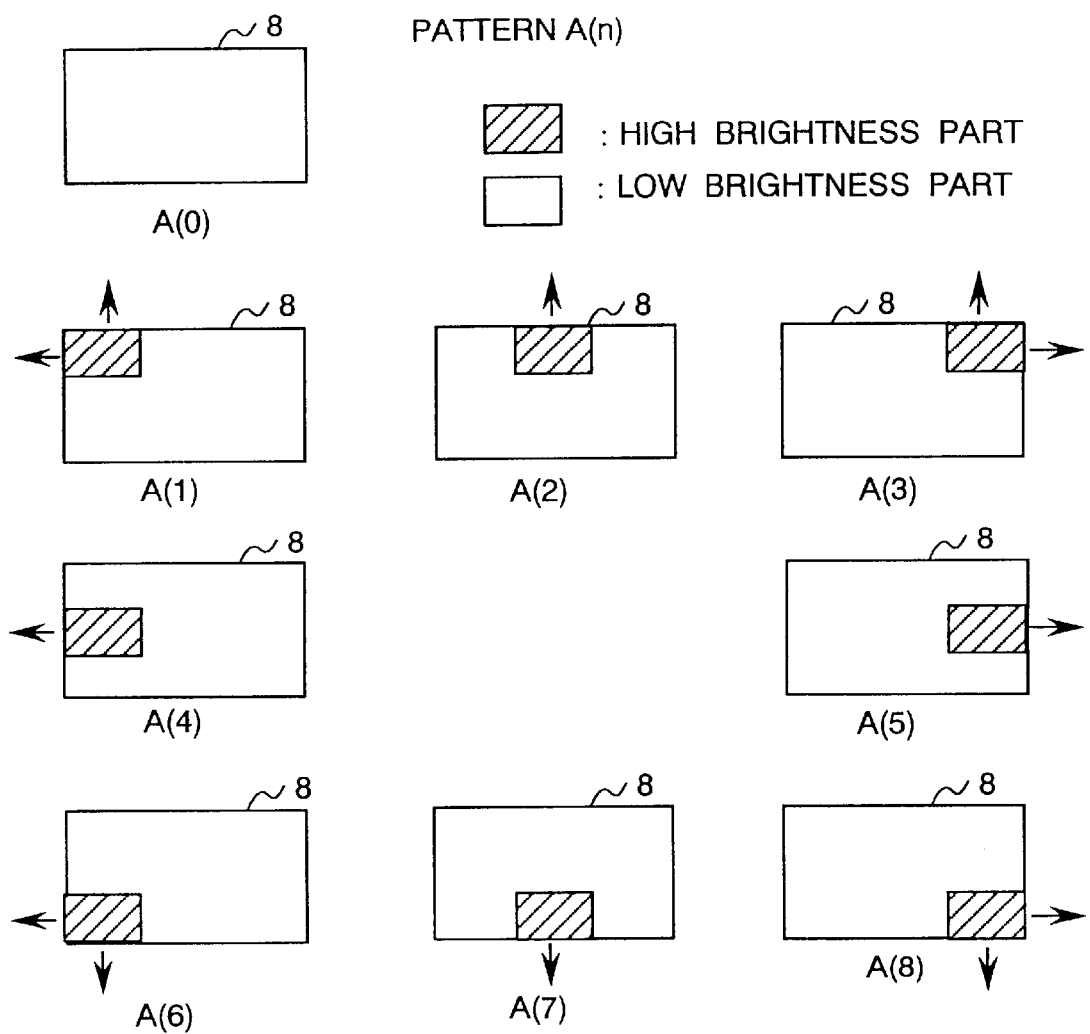
FIG. 49 is a drawing showing examples of signal patterns projected in the discrimination routine 1 and the discrimination routine 2.

Next, the discrimination method of the photo detector discriminator 62 will be explained by referring to FIGS. 48 and 49. FIG. 48 is a flow chart showing the operation of the photo detector discriminator 62 for discriminating the relationship between the connection lines and the photo detectors. FIG. 49 is a drawing showing examples of patterns to be used for discrimination of the photo detector.

When adjustment start instruction is inputted, the processing goes to the discrimination routine 1 shown in FIG. 48. Firstly, when n=0, at Steps SH1, SH2, and SH3, the minimum brightness received by each of the photo detectors 13a to 13h is detected beforehand. At Step SH1, a signal pattern A (0) is selected by the photo detector discriminator 62 from a plurality of patterns generated by pattern generated, and the display controller 29 is switched from a normal video signal to the selected signal. And the pattern A (0) is projected on the screen. At Step SH2, the outputs of all the photo detectors 13a to 13h are converted from analog to digital. At Step SH3, the A/D converted value is temporarily saved in the photo detector selection memory 63 as reference data.

Next, when n=1, at Step SH4, a pattern A (1) is selected and projected on the screen. At Step SH5, the outputs of all the photo detectors 13a to 13h are converted from analog to digital. At Step SH6, the A/D converted maximum value is compared with the aforementioned reference data. When the reference data is larger or the difference is small, it is discriminated that the photo detector cannot receive the light of pattern. When the reference data is much smaller, it is discriminated that the photo detector can receive the light of pattern. When the photo detector can receive the light of pattern, the connection line number is memorized in the area of n=1 of the photo detector selection monitor 63. The operations at Steps from SH4 to SH6 when n=1 are performed in the same way when n=2 to 8. At the stage that Step SH6 when n=8 ends, the relationship between the connection lines and the photo detectors becomes clear and information indicating the relationship is memorized in each area of the photo detector selection memory 63. Thereafter, the processing goes to Step SH9 and adjustment is executed under control of the automatic adjustment controller 30.

In adjustment at Step SH9, for example, when the output of the photo detector 13a is converted from analog to digital, an instruction therefor is inputted to the photo detector discriminator 62 from the automatic adjustment controller 30, and the information memorized in the area of n=1 of the photo detector selection memory 63, and the line connected to the photo detector 13a is selected by the photo detector selector 60 on the basis of this information, and the information is inputted to the A/D converter 61. The A/D converted data is outputted to the two-dimensional adjuster 32 or the one-dimensional adjuster 33 and the normalizer 36. The same operation is performed also for the photo detectors 13b to 13h.

As mentioned above, even when the connection line and photo detector are combined optionally, the system operates so that it is automatically set. Therefore, the photo detector and photo detector selector can be connected in a short time without the position relationship being ascertained.

When a value equivalent to the reference data at Step SH3 is set beforehand, it is possible to omit the operations at Steps SH1, SH2, and SH3. In this case, the time for detecting a signal pattern can be shortened.

Figure 50:
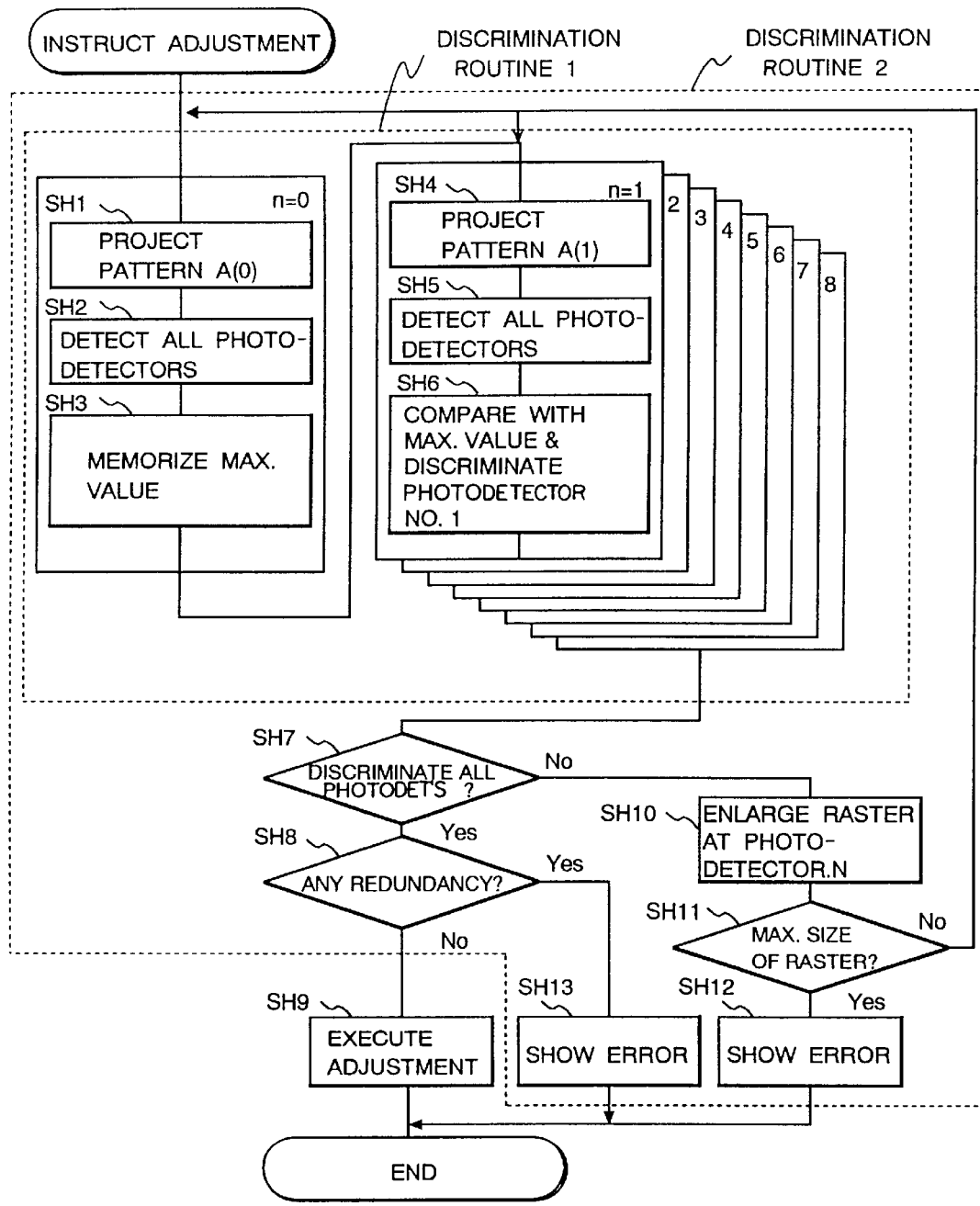
FIG. 50 is a flow chart showing the second operation of the photo detector discriminator.

FIG. 50 is a second flow chart showing the operation of the photo detector discriminator 62 for discriminating the relationship between the connection line and the photo detector. The discrimination routine 1 shown in the drawing is equivalent to the discrimination routine 1 used in FIG. 48. The same step number is assigned to each step which performs the same operation as that in FIG. 48.

When adjustment start instruction is inputted, the processing goes to the discrimination routine 2 shown in FIG. 50. The discrimination routine 1 performs the same operation as that in FIG. 48. When the discrimination routine 1 ends, the processing goes to Step SH7.

At Step SH7, it is discriminated whether all the photo detectors from n=1 to 8 can detect the light of the each pattern or not. When it is discriminated that all the photo detectors detect the light of the each pattern, the processing goes to Step SH8. When it is discriminated that the photo detectors do not detect the light of each pattern, the processing goes to Step SH10. At Step SH10, rasters are enlarged partially or entirely so that light emitted from the projection tube 7 is easily exposed to the photo detectors 13 in the overscanned area. If it is discriminated that when one of the signal patterns A(1) to A(8) shown in FIG. 49 is projected, it cannot be detected, the correction data of the frame memory 3 is rewritten so as to enlarge rasters partially only in the direction of the arrow marked in each of the signal patters A(1) to A(8). At Step SH11, it is discriminated whether rasters can be enlarged or not. When the data range memorized in the frame memory 3 is maximum or minimum, rasters cannot be enlarged. Therefore, an error indicating that the signal pattern cannot be detected is displayed at Step SH12 and the discrimination routine 2 ends. When rasters can be enlarged, the processing returns to Step SH1 or Step SH4 and detection is discriminated again.

At Step SH8, it is detected whether the selected value of the photo detector selector 60 is duplicated among n=1 to 8 or not. When it is duplicated, an error is displayed at Step SH13 and the discrimination routine 2 ends. When it is not duplicated, the discrimination routine 2 ends and adjustment is executed at Step SH9.

In the above explanation of the discrimination routine 2, a projection tube is used. When the discrimination routine 2 is executed for all the projection tubes, it can be discriminated whether adjustment can be executed properly for all the projection tubes or not.

As a result, even when no relationship can be set between the photo detectors and the positions on the screen, the system operates so that the position relationship is automatically set. Therefore, the terminal or connector can be attached in a short time without the position relationship being ascertained. At Steps SH10 and SH11, the system operates so as to automatically enlarge rasters as required, so that detection of the photo detectors arranged in the overscanned area or outside the screen where light is not radiated comparatively easily can be discriminated. Furthermore, since duplication of the position relationship is detected at Step SH8, miswiring such as not connected or in contact can be detected. Therefore, an abnormal convergence correction value will not be obtained during adjustment, so that the power of the apparatus is not interrupted because the protection circuit of the apparatus functions or the apparatus does not fail. Waste of time caused by failure of adjustment can be prevented.

In the embodiment, a mechanism that rasters are enlarged when light of the each pattern cannot be detected and a mechanism that duplication of the photo detectors is checked continuously when light of the each pattern is detected are installed. However, detection can be discriminated only by one of the mechanisms. When a value equivalent to the reference data at Step SH3 is set beforehand, it is possible to omit the operations at Steps SH1, SH2, and SH3. Furthermore, when it is discriminated that the raster is not the maximum size of raster at Step SH11, it is possible to detect the light of the pattern again only at Steps SH4, SH5, and SH6 for n when no detection is discriminated.

Figure 51:
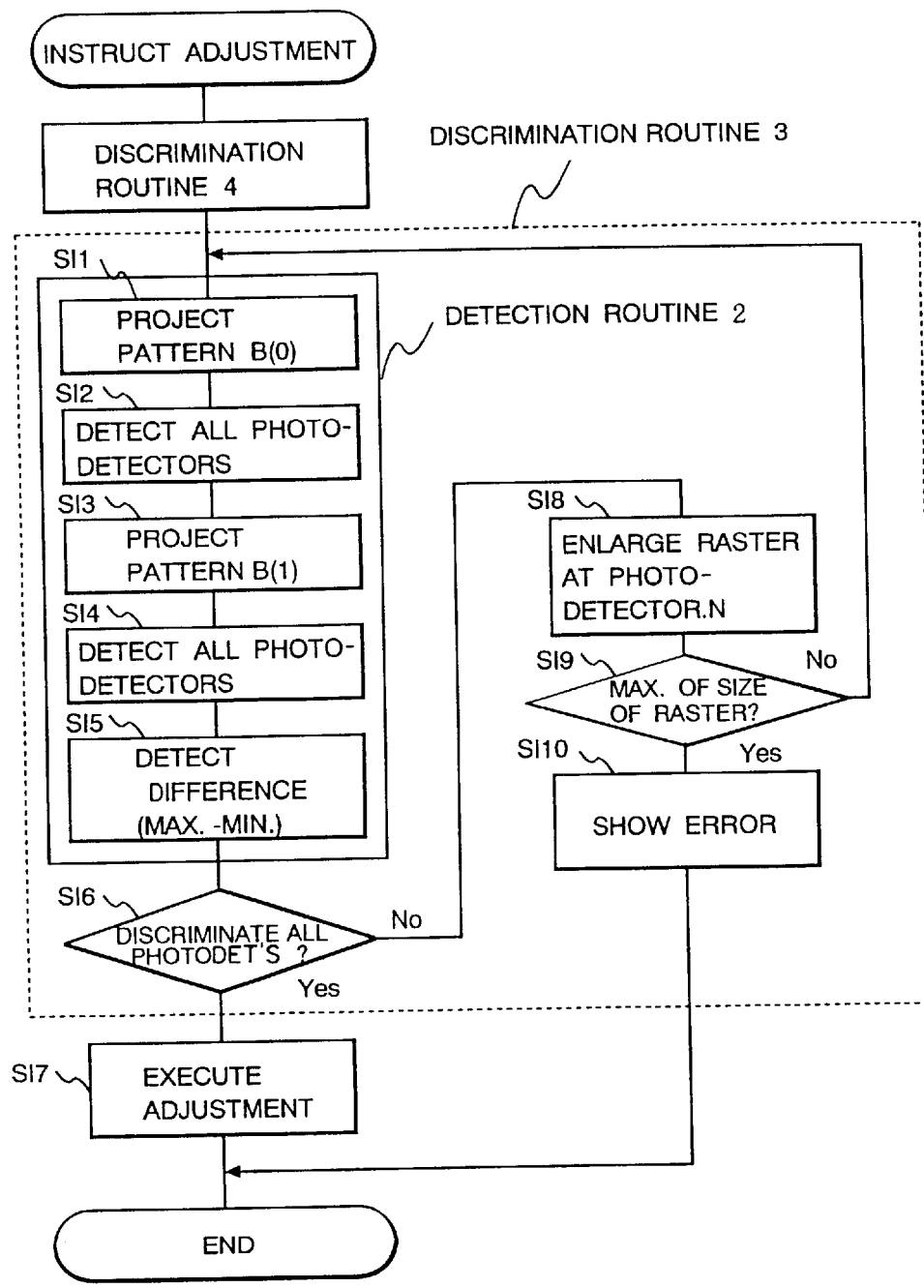
FIG. 51 is a flow chart showing the third operation of the photo detector discriminator.
Figure 52:
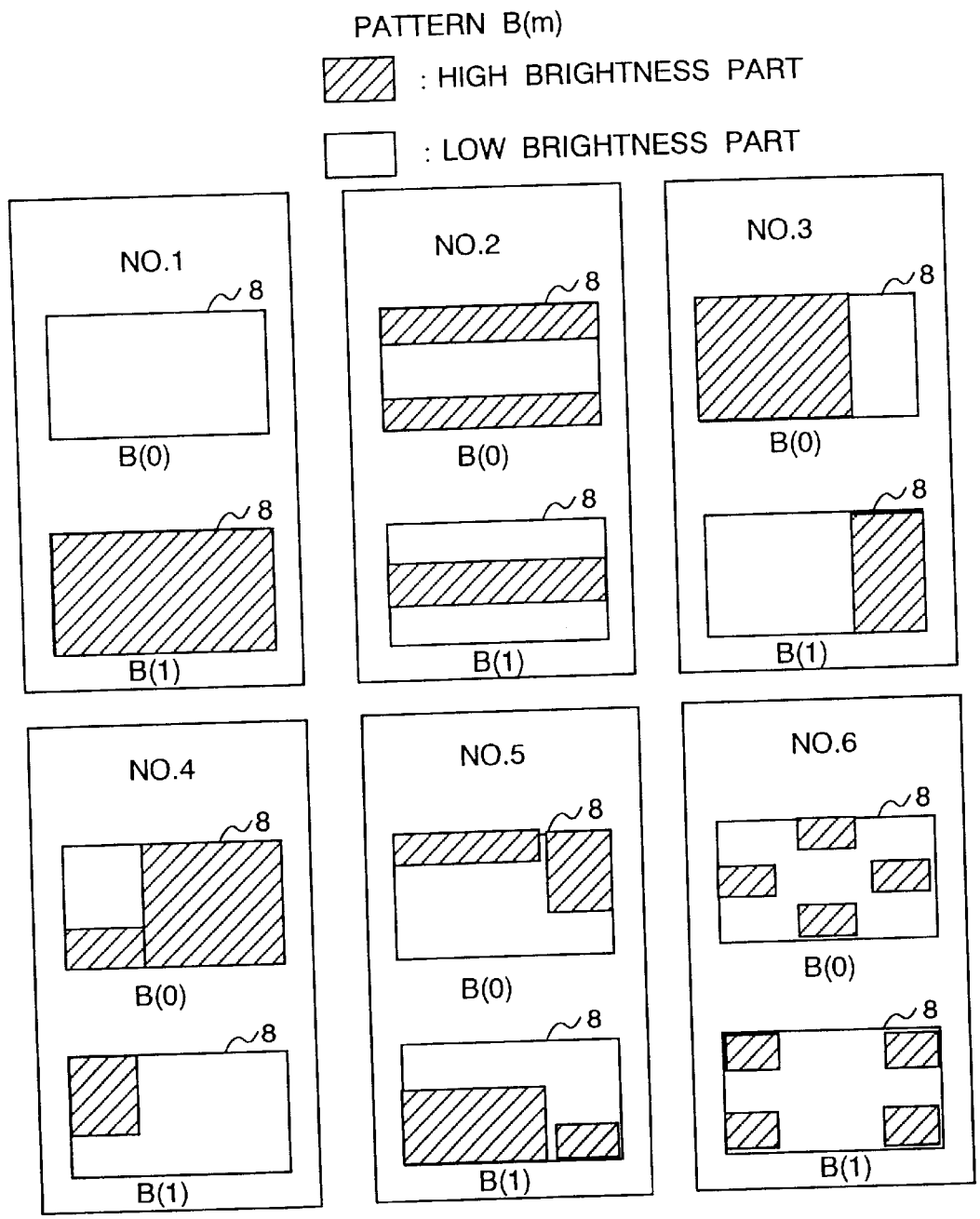
FIG. 52 is a drawing showing examples of signal patterns projected in the discrimination routine 3.

FIG. 51 is a third flow chart showing the operation of the photo detector discriminator 62. The discrimination routine 4 shown in the drawing is equivalent to the discrimination routine 1 or 2 shown in FIG. 48 or 50. The part enclosed by a dashed line shown in FIG. 51 indicates the discrimination routine 3. FIG. 52 is a drawing showing examples of signal patterns B(0) and B(1) of the pattern generator 16 to be used in the photo detector discrimination routine 3.

In a projection TV set using a color system, three red, blue, and green projection tubes are generally used. Therefore, the first color is discriminated by the discrimination routine 1 and the remaining second and third colors are discriminated by repeating the discrimination routine 3 two times. The discrimination routine 1 or 2 operates in the same way as in FIG. 48 or 50. Therefore, the explanation thereof is omitted and only the discrimination routine 3 will be described.

When it is discriminated that the first color is adjusted properly by the discrimination routine 1 or 2, the processing goes to the discrimination routine 3 and the second color is discriminated. Firstly at Step SI1, the signal pattern B(0) shown in FIG. 52 is selected and projected on the screen. At Step SI2, the outputs of all the photo detectors 13 are converted from analog to digital. Next at Step SI3, the signal pattern B(1) shown in FIG. 52 which is combined in the same way as the signal pattern projected at Step SI1 is selected and projected on the screen. At Step SI4, the outputs of all the photo detectors 13 are converted from analog to digital. At Step SI5, when the data difference between the maximum value and the minimum value when the outputs are converted from analog to digital by the signal patterns B(0) and B(1) is larger than the predetermined value, it is considered that the signal patterns are detected. When the data difference is smaller than the predetermined value, it is considered that the signal patterns are not detected. At Step SI6, it is discriminated whether light is radiated to the photoelectric devices of all the photo detectors or not. When it is considered that all the signal patterns are detected by all the photoelectric devices, the discrimination routine 3 ends. When it is not detected, the processing goes to Step SI8. Steps SI8, SI9, and SI10 operate in the same way as Steps SH10, SH11, and SH12 shown in FIG. 50. At Step SI8, the rasters equivalent to the part of the photo detector 13 which does not detect are enlarged so that light emitted from the projection tube 7 is easily radiated to the photo detectors 13 in the overscanned area. At Step SI9, it is discriminated whether rasters can be enlarged or not. When rasters cannot be enlarged, an error is displayed at Step SI10 and the discrimination routine 3 ends. When rasters can be enlarged, the processing returns to Step SI1 and detection is discriminated again.

The discrimination routine 3 is executed for all projection tubes for which it is not discriminated whether normal adjustment is executed or not or for all the projection tubes. When it is discriminated that normal adjustment can be executed by all the projection tubes, the processing goes to Step SI7 and adjustment is executed.

It is desirable that the signal patterns B(0) and B(1) of the discrimination routine 3 are a combination of two signal patterns which can be detected and cannot be detected on the position of the respective photo detectors 13 on the screen.

In addition to the effect shown in the description of FIG. 48, this embodiment can discriminate in a short time because there are not many signal patterns to be detected.

Figure 53:
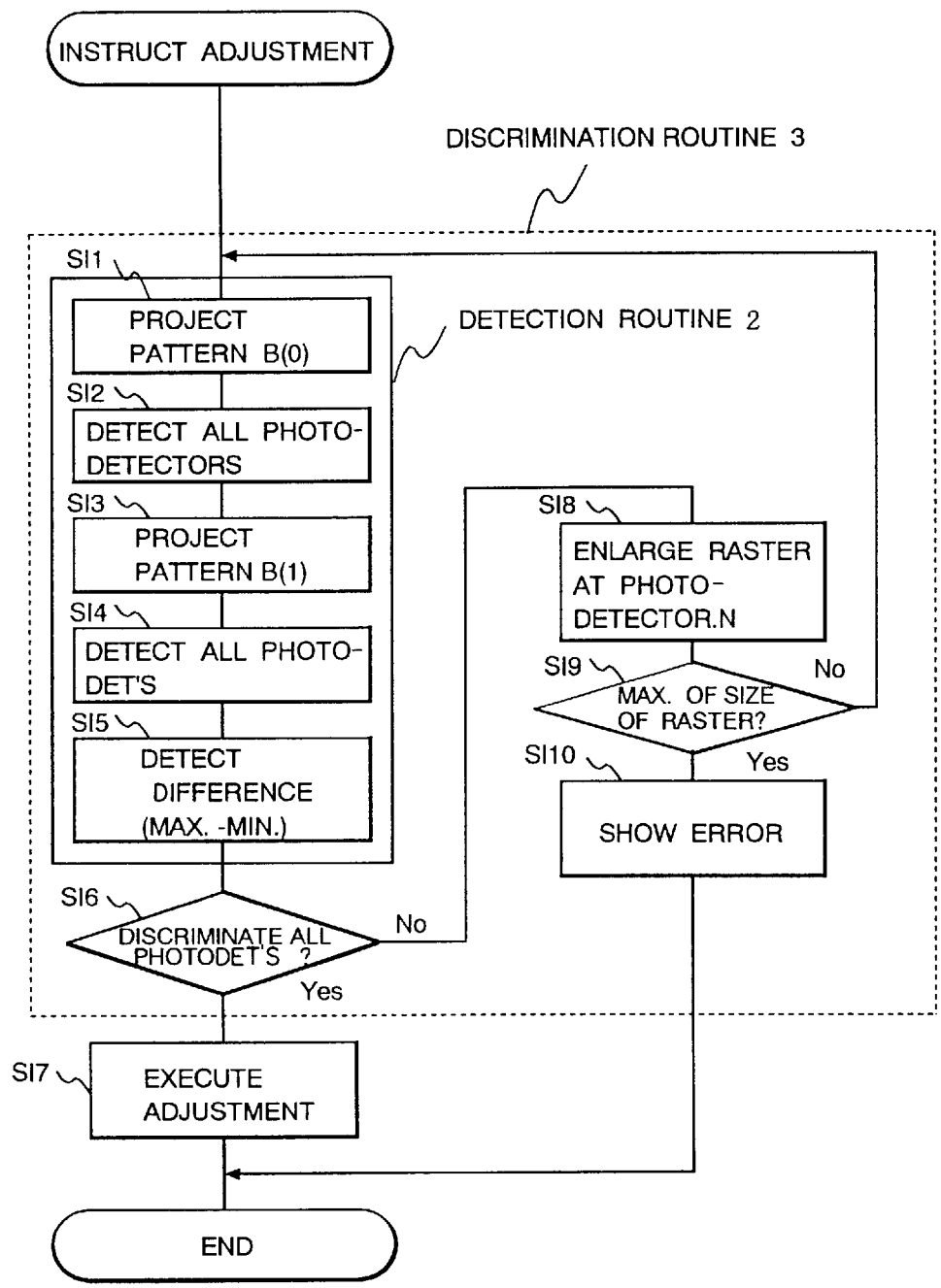
FIG. 53 is a flow chart showing the fourth operation of the photo detector discriminator.

FIG. 53 is a fourth flow chart showing the operation of the photo detector discriminator 62. The discrimination routine 3 shown in the drawing is equivalent to the discrimination routine 3 explained in the third embodiment of the present invention. In this embodiment, particularly the operation of the discriminator 12 when the relationship between the connection lines and the photo detectors is known beforehand is described.

Since the position relationship is known beforehand, when the discrimination routine 3 is executed for all the projection tubes, it can be discriminated whether all the projection tubes can be adjusted properly or not. An EEPROM is used as a photo detector selection memory 63 shown in FIG. 47. However, in this embodiment, it can be considered that the correspondence between the connection lines and the photo detectors is memorized beforehand using a ROM. As a result, the discrimination routine 3 operates almost in the same way as with the flow chart shown in FIG. 51, so that the explanation thereof will be omitted.

The detection routine 2 shown in FIGS. 51 and 53 executes almost the same processing as the detection routine 1 shown in FIG. 43 which is used for explanation of normalization. Therefore, it is possible to execute the threshold value calculation at Step SG5 shown in FIG. 43 at Step SI5 shown in FIGS. 51 and 53 and execute the normalization processing.

Figure 54:
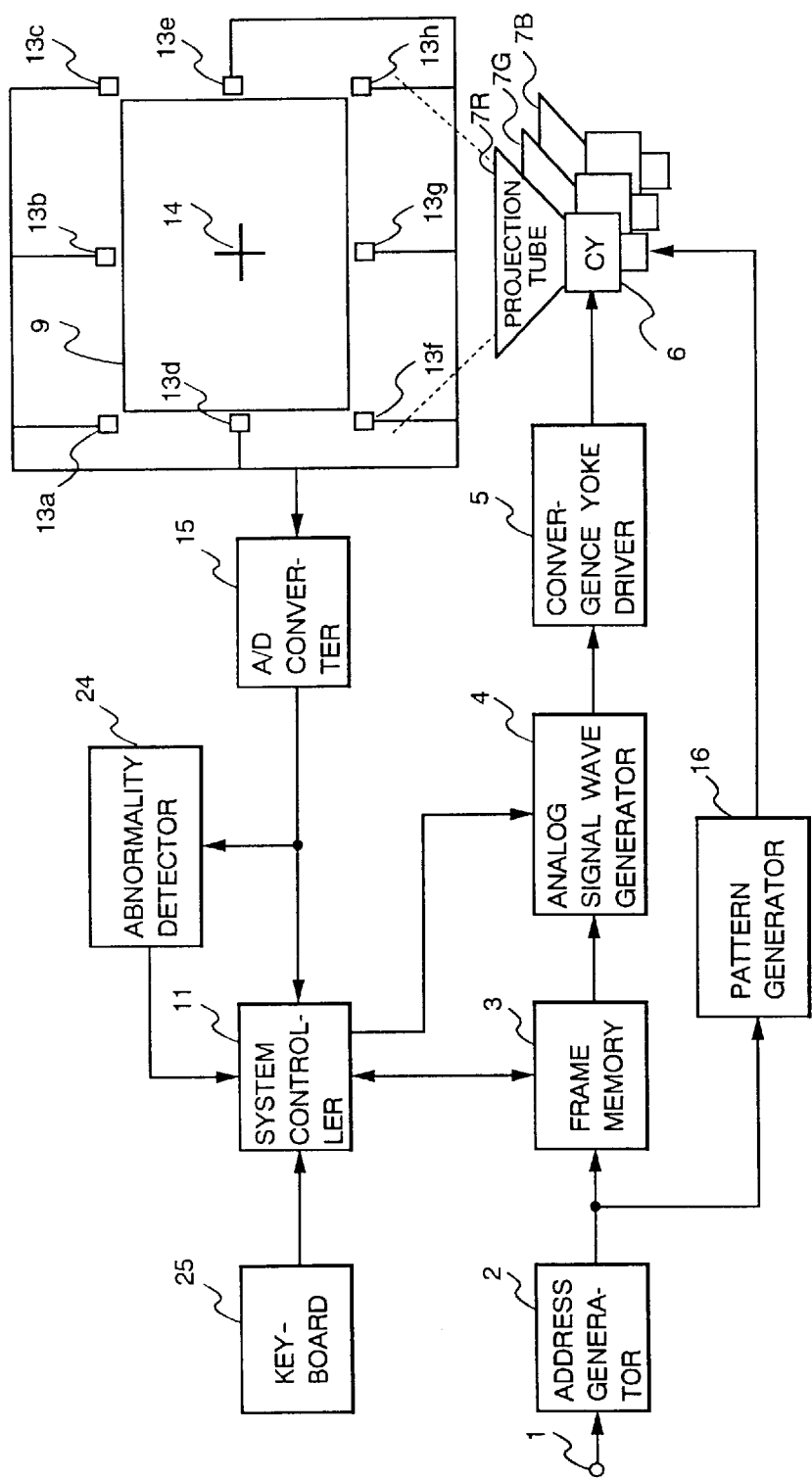
FIG. 54 is a block diagram of a color projection display apparatus using a plurality of projection tubes relating to the third embodiment of the present invention.

Next, a practical embodiment of the present invention which can respond to an error of the photo detectors or low precision of the screen center where no photo detector can be installed will be explained. FIG. 54 is a block diagram of a color projection display apparatus using a plurality of projection tubes to which the convergence correction system with recovery function of the present invention is applied.

In FIG. 54, the same number as that shown in FIG. 1 is assigned to each component which performs the same operation as that shown in FIG. 1 and the explanation thereof will be omitted. A numeral 24 indicates an abnormality detector for detecting an error of the photo detectors and 11 a system controller such as a microcomputer for calculating an output of the A/D converter 15 and an instruction of the keyboard 25 and rewriting the content of the memory 3, which has a function for changing the convergence adjustment control according to the error detection result of the abnormality detector 24. The system controller 11 controls the pattern generator 16.

The convergence correction operation is the same as that in the embodiment shown in FIG. 1, so that the explanation will be omitted.

Figure 55:
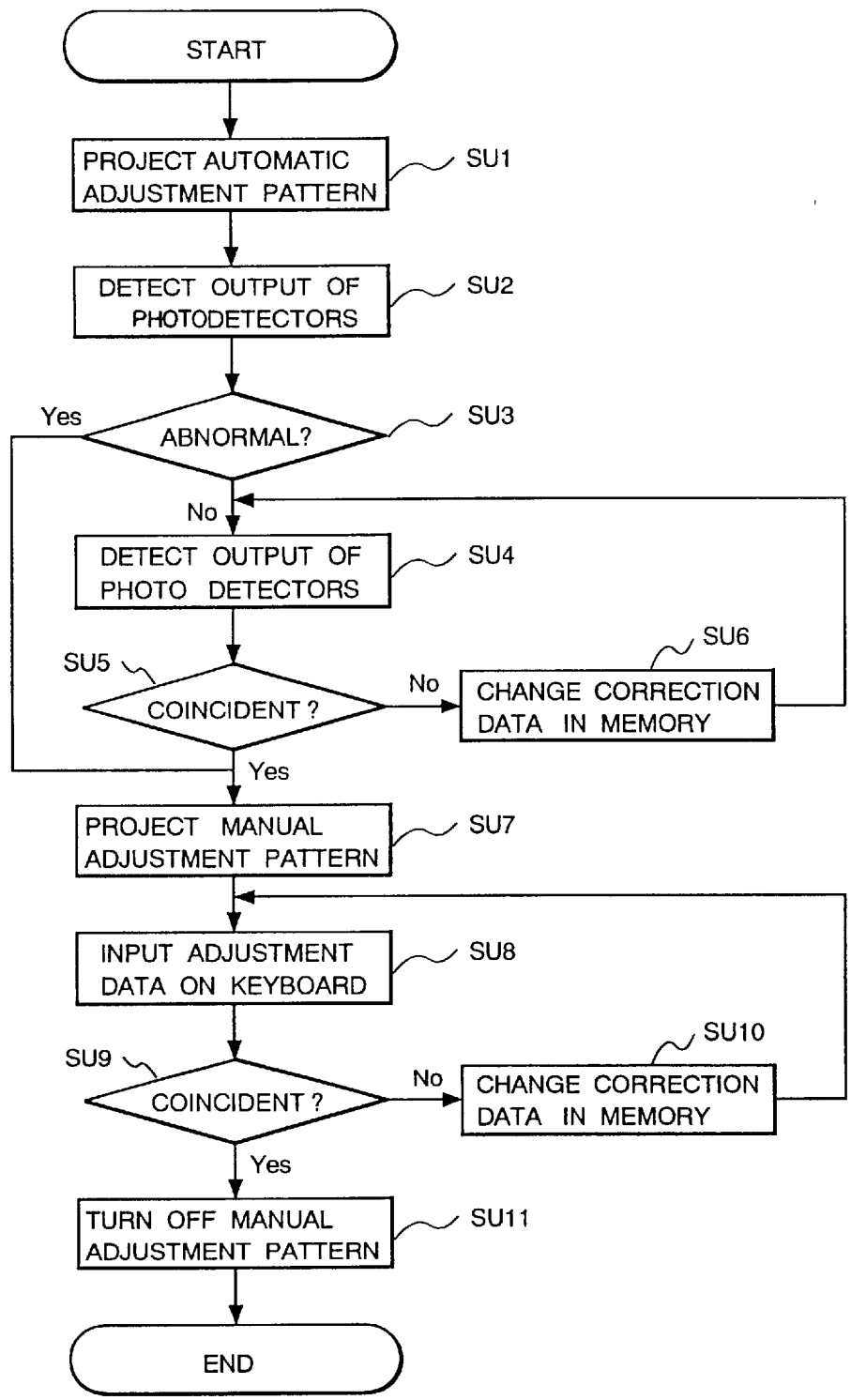
FIG. 55 is a flow chart showing the processing when misconvergence is corrected in the third embodiment.

The operation for convergence adjustment will be explained hereunder. The processing procedure therefor is shown in the flow chart in FIG. 55.

Firstly, the processing for discriminating an error of a photo detector is executed. At Step SU1, a photo detector adjustment pattern signal suited to convergence detection on the photo detector 13 is generated by the pattern generator 16 by an instruction of the system controller 11. This photo detector adjustment pattern signal is projected on the photo detector 13. At Step SU2, the outputs of the photo detectors 13a to 13h are converted to digital values and the light detection result is sent to the abnormality detector 24. At Step SU3, an error in the photo detector 13 is discriminated by the system controller 11 on the basis of the error detection output of the abnormality detector 24.

As a result, when no error is found in the photo detector 13, the automatic convergence adjustment at Step SU4 and the subsequent steps is executed. At Step SU4, the outputs of the photo detectors 13a to 13h are converted to digital values and the light detection result is sent to the system controller 11. At Step SU5, it is discriminated whether the adjustment patters displayed on the photo detectors at the eight locations are coincident with each other or not by calculation of the system controller 11. When there is an adjustment pattern which is not coincident in one of the photo detectors, the correction data in the neighborhood of the photo detector where the adjustment pattern is not coincident is changed at Step SU6, and the processing returns to Step SU4, and the above operation is iterated until the adjustment patterns coincide with each other in all the photo detectors. After the aforementioned steps are executed, control is passed to Step SU7. When the precision of the screen center where no photo detector can be installed is not good, manual adjustment is executed. When it is not required, the processing goes to Step SU11 straight.

Next, processing when there is an error in the photo detector 13 and normal automatic convergence adjustment cannot be executed will be explained. When an error is found in the photo detector 13 at Step SU3, control is passed to the manual adjustment at Step SU7 and the subsequent steps. At Step SU7, a manual adjustment pattern signal suited to manual convergence adjustment is generated by the pattern generator 16 according to an instruction of the system controller 11. In this case, an adjustment pattern is also displayed in the neighborhood of the overscanned area of the screen and convergence at each of the positions where the photo detectors 13a to 13h are arranged is manually adjusted. At Step SU8, the pattern projected on the screen 9 is discriminated by an adjuster and an instruction of adjustment is sent from the keyboard 25. At Step SU9, the instruction of the keyboard 25 is interpreted by the system controller 11. When the convergence of each displayed adjustment pattern is not coincident with the photo detector, the correction data is changed at Step SU10 and the processing is returned to Step SU8, and the above operation is iterated until the convergence is adjusted. After the aforementioned steps are executed, the adjustment pattern is erased at Step SU11 and the manual convergence adjustment ends.

According to this embodiment, even when light detection cannot be executed properly by light radiated from the outside of the display apparatus or the precision of the screen center where no photo detector can be installed is not good, the convergence can be adjusted precisely by manual adjustment.

It is possible that only the adjustment part where the photo detector in which an error occurs is arranged is adjusted manually and the adjustment parts where the photo detectors in which no error occurs are arranged are automatically adjusted using the photo detectors.

Furthermore, by realizing the functions of the abnormality detector 24 and the system controller 11 by one system controller 11, the same effect can be produced.

In the aforementioned embodiment, the projection display apparatus is described so as to ensure easy understanding. However, the present invention can be applied to display apparatuses such as all color TV sets and displays having built-in digital convergence correction system.

What is claimed is:

1. A convergence correction system with a misconvergence recovery function for a TV set or a display, said system comprising:

a first memory for memorizing correction data;

an address generator for reading correction data from said memory according to scanning of a screen;

an analog signal wave generator for generating a convergence correction wave based on the read correction data;

a pattern generator for generating adjustment patterns;

a first convergence adjuster for changing the correction data memorized in said first memory so as to adjust convergence in a visible area of the screen;

a second memory for memorizing the correction data memorized in said first memory as changed by the first convergence adjuster;

a plurality of photoelectric devices arranged at eight positions in an overscanned area of the screen at substantially the middle of each of upper, lower, left, and right sides of the screen and at substantially four corners of the screen;

a plurality of photodetectors using said photoelectric devices;

an analog-digital converter for converting outputs of said photodetectors to digital values; and a second convergence adjuster for changing the correction data memorized in said first memory on the basis of said digital values so as to make a positional relationship between said adjustment patterns and said photoelectric devices constant.

2. A convergence correction system with a misconvergence recovery function according to claim 1, wherein a signal line for enlarging a deflection size to a predetermined size during operation of the second convergence adjuster and returning it to an original deflection size after the operation of the second convergence adjuster ends is provided.

3. A display apparatus using a convergence correction system with a misconvergence recovery function according to claim 1.

4. A display apparatus according to claim 3, wherein said display apparatus is a color projection display apparatus or a color projection TV set using a plurality of projection tubes.

5. A convergence correction system used for a TV set or a display, the convergence correction system comprising:

a first memory for memorizing correction data for convergence correction;

an address generator for generating an address for reading the correction data from the first memory according to scanning of a screen;

a waveform generator for generating a convergence correction waveform based on the correction data read by the address generator;

a pattern generator for generating adjustment patterns;

a first convergence adjuster for changing the correction data memorized in the first memory according to an adjustment operation for convergence correction which is executed during display of the adjustment patterns generated by the pattern generator;

a second memory for memorizing the correction data memorized in the first memory as changed by the first convergence adjuster;

eight photodetectors which are arranged at positions at substantially the middle of each of upper, lower, left, and right sides of the screen and at substantially four corners of the screen and detect video light incident on the positions;

an analog-digital converter for converting outputs of the photodetectors to digital values;

a second convergence adjuster for changing the correction data memorized in the first memory so as to correct mislocation of the displayed adjustment patterns at substantially the positions at which the eight photodetectors are arranged on the basis of the digital values obtained by the analog-digital converter;

a third memory for memorizing the correction data memorized in the first memory as changed by the second convergence adjuster; and a calculator for calculating final correction data to be memorized in the first memory on the basis of the correction data memorized in the second memory of the correction data memorized in the third memory.

6. A convergence correction system according to claim 5, wherein the calculator includes:

a differentiator for calculating correction data for misconvergence at substantially the positions at which the eight photodetectors are arranged on the basis of the correction data memorized in the third memory;

an interpolator for calculating correction data for the whole screen on the basis of the correction data obtained by the differentiator; and an adder for adding the correction data obtained by the interpolator and the correction data memorized in the second memory and calculating the final correction data.

7. A convergence correction system used for a TV set or a display, the convergence correction system comprising:

a first memory for memorizing correction data for convergence correction;

a waveform generator for generating a convergence correction waveform based on the correction data memorized in the first memory;

a first correction data generator for generating first correction data according to manual adjustment of convergence;

eight photodetectors which are arranged at positions at substantially the middle of each of upper, lower, left, and right sides of a screen and at substantially four corners of the screen and detect video light incident on the positions;

a second correction data generator for generating second correction data for correcting mislocation of displayed adjustment patterns at substantially the positions at which the eight photodetectors are arranged on the basis of outputs of the photodetectors; and a correction data corrector for correcting the correction data memorized in the first memory on the basis of the first correction data generated by the first correction data generator and the second correction data generated by the second correction data generator.

8. A convergence correction system used for a TV set or a display, the convergence correction system comprising:

a waveform generator for receiving correction data for convergence correction and generating a convergence correction waveform based on the correction data;

eight photodetectors which are arranged at positions at substantially the middle of each of upper, lower, left, and right sides of a screen and at substantially four corners of the screen and detect video light incident on the positions;

a correction data generator for generating correction data for correcting mislocation of displayed adjustment patterns at substantially the positions at which the eight photodetectors are arranged on the basis of outputs of the photodetectors; and a correction data corrector for correcting the correction data received by the waveform generator on the basis of the correction data generated by the correction data generator.

9. A convergence correction system used for a TV set or a display, the convergence correction system comprising:

a waveform generator for receiving correction data for convergence correction and generating a convergence correction waveform based on the correction data;

eight photodetectors which are arranged at positions at substantially the middle of each of upper, lower, left, and right sides of a screen and at substantially four corners of the screen and detect video light incident on the positions;

a correction data generator for generating correction data for convergence correction at substantially the positions at which the eight photodetectors are arranged on the basis of outputs of the photodetectors; and a correction data corrector for correcting the correction data received by the waveform generator on the basis of the correction data generated by the correction data generator.

* * * * *